(12) United States Patent
Nielsen et al.

(10) Patent No.: US 12,246,903 B2
(45) Date of Patent: Mar. 11, 2025

(54) FOIL PACK

(71) Applicant: Medtronic, Inc., Minneapolis, MN (US)

(72) Inventors: Christian S. Nielsen, River Falls, WI (US); Timothy T. Bomstad, Bigfork, MN (US); Lance B. Lohstreter, Brooklyn Park, MN (US); John D. Norton, Saint Paul, MN (US); Mark E. Viste, Brooklyn Center, MN (US); Paul B. Young, New Richmond, WI (US)

(73) Assignee: Medtronic, Inc., Minneapolis, MN (US)

( * ) Notice: Subject to any disclaimer, the term of this patent is extended or adjusted under 35 U.S.C. 154(b) by 643 days.

(21) Appl. No.: 17/453,086

(22) Filed: Nov. 1, 2021

(65) Prior Publication Data

US 2022/0135311 A1 May 5, 2022

Related U.S. Application Data

(60) Provisional application No. 63/108,671, filed on Nov. 2, 2020.

(51) Int. Cl.
*B65D 81/18* (2006.01)
*H01G 9/08* (2006.01)
*H01M 50/20* (2021.01)

(52) U.S. Cl.
CPC ............... *B65D 81/18* (2013.01); *H01G 9/08* (2013.01); *H01M 50/20* (2021.01); *B65D 2201/00* (2013.01)

(58) Field of Classification Search
CPC .......... H01M 50/20; B65D 81/18; H01G 9/08
See application file for complete search history.

(56) References Cited

U.S. PATENT DOCUMENTS

| 4,266,332 A | 5/1981 | Markarian et al. |
| 6,048,638 A | 4/2000 | Pendalwar |
| (Continued) | | |

FOREIGN PATENT DOCUMENTS

| CN | 202066650 U | 12/2011 |
| CN | 203259308 U | 10/2013 |
| (Continued) | | |

OTHER PUBLICATIONS

International Search Report and Written Opinion of International Application No. PCT/US2021/072174, dated Feb. 10, 2022, 12 pp.

(Continued)

*Primary Examiner* — Karie O'Neill Apicella
(74) *Attorney, Agent, or Firm* — Shumaker & Sieffert, P.A.

(57) ABSTRACT

An apparatus having a foil pack defining a device enclosure and a fluid conduit defining a fluid channel. The device enclosure may be configured to hold an energy storage device such as a battery or capacitor. The fluid conduit defines a fluid channel configured to allow a flow from the device enclosure through a test port defined by the fluid conduit. The apparatus is configured to establish a vacuum in the device enclosure when a vacuum is established in the fluid channel (e.g., during leak testing of the device enclosure). A scaffolding within the fluid conduit is configured to configured to resist a collapse of the fluid channel when the vacuum is established in the fluid channel.

20 Claims, 9 Drawing Sheets

(56) References Cited

U.S. PATENT DOCUMENTS

| | | | |
|---|---|---|---|
| 6,371,996 B1 | 4/2002 | Takayama et al. |
| 6,379,838 B1 | 4/2002 | Olsen et al. |
| 6,676,714 B2 | 1/2004 | Langan |
| 7,571,636 B2 | 8/2009 | Mayer |
| 7,578,170 B2 | 8/2009 | Mayer et al. |
| 8,025,999 B2 | 9/2011 | Kim et al. |
| 8,043,743 B2 | 10/2011 | Park et al. |
| 8,501,334 B2 | 8/2013 | Yi |
| 8,758,931 B2 | 6/2014 | Yebka et al. |
| 9,431,648 B2 | 8/2016 | Thoennessen et al. |
| 9,810,600 B2 | 11/2017 | Wetzig et al. |
| 2002/0106555 A1 | 8/2002 | Langan |
| 2003/0232236 A1 | 12/2003 | Mitchell et al. |
| 2004/0134259 A1 | 7/2004 | Haug et al. |
| 2008/0070101 A1 | 3/2008 | Barrella |
| 2015/0270530 A1 | 9/2015 | Thoennessen et al. |
| 2017/0268957 A1 | 9/2017 | Wetzig et al. |
| 2018/0115012 A1 | 4/2018 | Locke et al. |
| 2018/0219191 A1 | 8/2018 | Drews et al. |
| 2021/0257699 A1* | 8/2021 | Mochizuki | H01G 11/20 |

FOREIGN PATENT DOCUMENTS

| | | | |
|---|---|---|---|
| CN | 110160714 A | 8/2019 |
| CN | 209455293 U | 10/2019 |
| EP | 1772914 A2 | 4/2007 |
| FR | 3057708 A1 | 4/2018 |
| KR | 101504596 B1 | 3/2015 |
| KR | 101852790 B1 | 4/2018 |
| WO | WO-2019230742 A1 * | 12/2019 | H01G 11/18 |

OTHER PUBLICATIONS

Su, J., "Assessment of Performance and Safety on Lithium Ion Pouch Battery Under Various Test Conditions," retrieved from https://www.batterypoweronline.com/articles/assessment-of-performance-and-safety-on-lithium-ion-pouch-battery-under-various-test-conditions/ on Mar. 3, 2020, 5 pp.

* cited by examiner

US 12,246,903 B2

FOIL PACK

This application claims the benefit of U.S. Provisional Patent Application Ser. No. 63/108,671, filed Nov. 2, 2020, which is entitled, "FOIL PACK" and is incorporated by reference herein in its entirety.

TECHNICAL FIELD

This disclosure is related to foil packs configured to enclose an energy storage device.

BACKGROUND

Foil packs and the like may be configured to fluidly isolate an energy storage device, such as a capacitor, battery or other device including an electrochemical cell, from an environment surrounding an exterior of the foil pack. The energy storage device may include one or more conductors extending through the foil pack to the exterior of the foil pack. In some cases, a boundary integrity of the foil pack may be evaluated by leak testing a portion of the foil pack substantially surrounding the energy storage device and the conductors.

SUMMARY

In an example, an apparatus includes a foil pack defining a device enclosure configured to enclose an energy storage device, a fluid conduit defining a test port and defining a fluid channel in fluid communication with the device enclosure, wherein the fluid channel defines a flow path configured to allow a flow of a fluid from the device enclosure through the test port; and a scaffolding within the fluid channel configured to resist a collapse of the fluid channel when a vacuum is established in the fluid channel.

In an example, an apparatus includes a foil pack defining a device enclosure, an energy storage device within the device enclosure, wherein the energy storage device includes a first conductor and a second conductor, wherein the first conductor and the second conductor extend from the device enclosure through a device enclosure wall defining the device enclosure, a fluid conduit defining a test port and defining a fluid channel in fluid communication with the device enclosure, wherein the fluid channel defines a flow path configured to allow a flow of a fluid from the device enclosure through the test port, and a scaffolding within the fluid channel configured to resist a collapse of the fluid channel when a vacuum is established in the fluid channel, wherein the apparatus is configured to shrink the fluid conduit toward the scaffolding when the vacuum is established in the fluid channel.

In an example, a technique includes drawing a vacuum in a fluid channel defined by a fluid conduit using a test port defined by the fluid conduit, drawing a vacuum in a device enclosure of the foil pack using the vacuum drawn on the fluid channel, and resisting a collapse of the fluid channel as the vacuum is drawn using a scaffolding within the fluid channel.

The details of one or more examples are set forth in the accompanying drawings and the description below. Other features, objects, and advantages will be apparent from the description and drawings, and from the claims.

DETAILED DESCRIPTION

Figure 1:
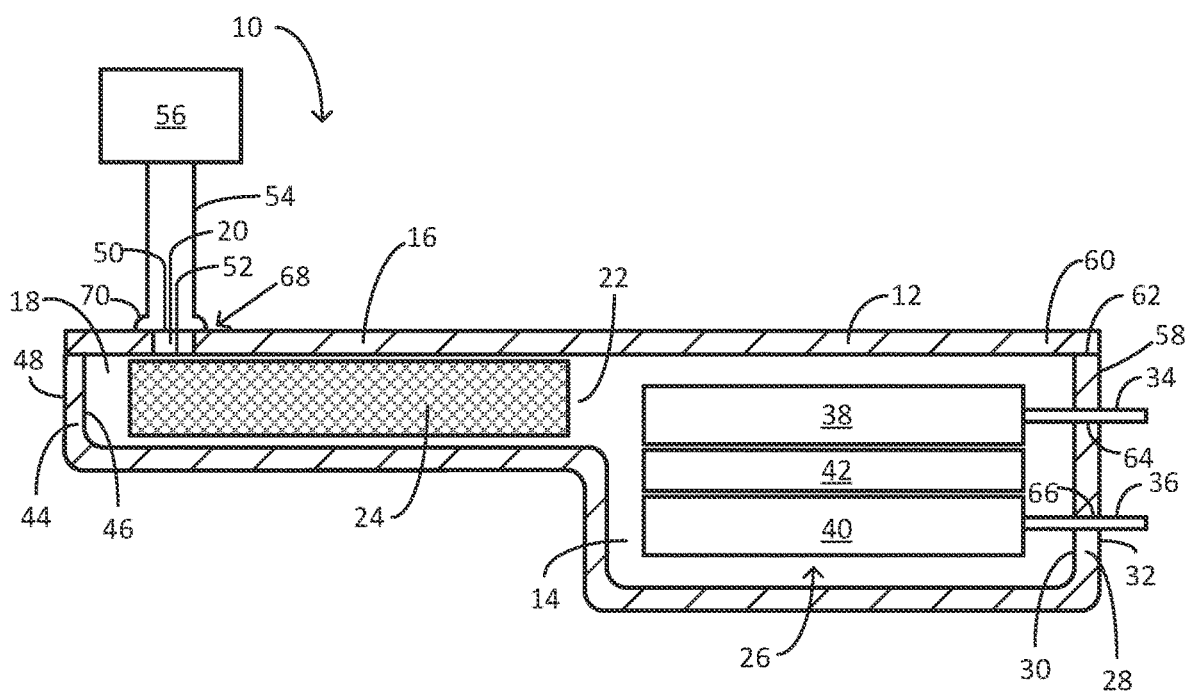
FIG. 1 is a conceptual diagram schematically illustrating an example apparatus.

This disclosure describes an apparatus including a foil pack defining a device enclosure configured to surround an energy storage device and a fluid conduit in fluid communication with the device enclosure. The device enclosure substantially surrounds the energy storage device to fluidly isolate the energy storage device from an environment surrounding an exterior of the foil pack. For example, the energy storage device may be configured for placement within the housing of a portable instrument such as an implantable medical device (IMD) or other device, with the foil pack substantially isolating the energy storage device from other components in the portable instrument. In examples, the foil pack comprises a malleable material defining the device enclosure, such that enclosure defined varies its shape and/or volume based on a pressure within the device enclosure. The fluid conduit is configured to provide a flow path from the device enclosure to a test port, in order to allow for leak testing to evaluate the integrity of the boundary of the device enclosure.

The energy storage device may be, for example, a battery (e.g., a primary or secondary battery including an electrochemical cell) or a capacitor. In some examples, the energy storage device includes an electrolyte which may be solid, semi-solid, or liquid. The energy storage device may be configured such that the electrolyte substantially resides between two or more electrode plates. The plates may be substantially planar, substantially rolled, or have some other general shape. The foil pack may be configured to substantially contain the electrode plates and the electrolyte in a spatial relationship sufficient to cause satisfactory operation of the energy storage device (e.g., charge and/or discharge).

The energy storage device may be configured to include a first conductor (e.g., a cathode) in electrical communication with a first electrode plate of the energy storage device. The energy storage device may be configured to include a second conductor (e.g., an anode) in electrical communication with a second electrode plate of the energy storage device. The first conductor and/or second conductor may be, for example, a conductive tab comprising an electronically conducting material. The foil pack may be configured such that the first conductor and/or the second conductor extend from within the device enclosure to an exterior of the foil pack. In examples, the energy storage device is configured for electrical connection to components outside the device enclosure and separate from the foil pack using the first conductor and/or the second conductor. For example, the foil pack may be configured such that the first conductor and/or the second conductor of the energy storage device may be electrically connected to circuitry within an implantable medical device.

In examples, the energy storage device may be employed in IMDs that provide cardiac rhythm management therapy. In some instances, the energy storage device may be used by a medical device configured to deliver electrical stimulation to a patient in the form of neurostimulation therapy (e.g., spinal cord stimulation therapy, deep brain stimulation therapy, peripheral nerve stimulation therapy, peripheral nerve field stimulation therapy, pelvic floor stimulation therapy, and the like). In some examples, the energy storage device may be employed in medical devices configured to monitor one or more patient physiological parameters, e.g., by monitoring electrical signals of the patient, alone or in conjunction with the delivery of therapy to the patient. In examples, the energy storage device is a lithium primary battery. The energy storage device may be capable of holding a charge for several years. In general, the energy storage device may supply power to one or more electrical components of an IMD, such as, e.g., the signal generation circuitry, to allow the IMD to deliver therapy to a patient, e.g., in the form of monitoring one or more patient parameters, delivery of electrical stimulation, or delivery of a therapeutic drug fluid.

The foil pack is configured to support leak testing of the device enclosure when the electrode plates are positioned within the device enclosure and the conductors are situated to extend from the device enclosure to an exterior of the foil pack. The device enclosure may be leak tested using the fluid conduit defining the test port and the fluid channel. The fluid channel is configured to define a flow path allowing a flow of a fluid (e.g., a liquid and/or gas) from the device enclosure through the test port. In examples, the fluid channel is configured to establish fluid communication between the test port and the device enclosure. In some examples, the fluid conduit may be a substantially elongated arm defining the fluid channel in an interior of the elongated arm. In some examples, the fluid conduit may substantially define a test enclosure separate from the device enclosure, with the test enclosure defining the fluid channel. The test port defined by the foil pack is configured to provide fluid communication from an exterior of the foil pack to the interior of the fluid conduit, such that a fluid may be withdrawn from the device enclosure via the fluid channel using the test port (e.g., during vacuum testing of the device enclosure). In examples, the test port is configured such that a fluid may be supplied to the device enclosure via the fluid channel using the test port (e.g., during electrolyte fill of the energy storage device).

The fluid conduit is configured to provide for leak testing of the device enclosure using the test port and fluid channel. For example, with one of more components of the energy storage device (e.g., the electrode plates) positioned in the device enclosure, the device enclosure may be leak tested to evaluate the integrity of the foil pack portion bounding the device enclosure and/or surrounding one or more conductors extending through the enclosure. The apparatus is configured such that a test line connected to a vacuum pump may be fluidly connected to the test port. The test line may be fluidly connected to a device configured to a conduct a constituent analysis of a gas withdrawn from the device enclosure, such as a mass spectrometer. The device enclosure may be leak tested by surrounding the device enclosure (e.g., substantially surrounding the foil pack) with a test gas such as helium (He), then drawing a vacuum on the device enclosure via the test port and the fluid channel using, for example, a vacuum pump. Drawing the vacuum via the test port and the fluid channel establishes a sustainably reduced pressure in the device enclosure and the fluid channel relative to the test gas surrounding the foil pack. The foil pack may be leak tested by analyzing the gas withdrawn from the device enclosure for traces of the test gas. The presence of the test gas in the gas withdrawn from the device enclosure may serve as an indication that gas leakage is occurring from the foil pack exterior (surrounded by the test gas) into the device enclosure. Such gas leakage may indicate an insufficient boundary integrity of the portion of the foil pack defining the boundary of the device enclosure. In some examples, insufficient boundary integrity of the portion of the foil pack defining the boundary may be indicated by measuring a displacement of some portion of the foil pack.

As discussed, in examples the foil pack defines the device enclosure and the fluid conduit defines the fluid channel using a malleable material (e.g., a metal foil and laminate metal-polymer assemblies). The malleable material may be configured to deflect when a pressure differential is present between a first side of the material and a second side of the material opposite the first side. For example, when a pressure within the device enclosure and/or the fluid channel of the apparatus is less than a pressure external to the foil pack, the malleable material may deflect in a manner which tends to decrease the volume of the device enclosure and/or the fluid channel. The deflection of the malleable material under the uneven pressure loading may cause the fluid channel defined by the fluid conduit to reduce in volume or substantially collapse, disrupting the fluid communication between the test port and the device enclosure. This may place a constraint on the vacuum which can be effectively established within the device enclosure for the purpose of leak testing.

The foil pack disclosed herein may include a scaffolding within the fluid channel configured to resist a collapse of the fluid channel. The scaffolding may extend at least from the test port to at least the device enclosure. The scaffolding is configured to resist the collapse while maintaining fluid communication between the fluid channel and the device enclosure. In examples, the scaffolding is configured to maintain fluid communication between the test port and the device enclosure, e.g., when a vacuum environment is established within the device enclosure. The scaffolding may possess a rigidity greater than the malleable material defining the fluid channel, such that when a vacuum is present within the fluid channel, contact between the malleable material and the scaffolding ceases further deflection of the malleable material. In some examples, the scaffolding comprises a porous separation material configured to maintain fluid communication between the fluid channel and the device enclosure using the porosity of the material when the porous separation material contacts the deflecting malleable material. In some examples, the scaffolding is a rigid structure (e.g., substantially non-porous) configured to define flow channels within the rigid structure and configured to maintain fluid communication between the fluid channel and the device enclosure using the flow channels when the rigid structure contacts the deflecting malleable material. Hence, the scaffolding is configured to resist a tendency of the malleable material defining the fluid channel to collapse the fluid channel when a vacuum is present within the fluid channel (e.g., during leak testing). This may allow a greater vacuum to be applied to the device enclosure during leak testing, increasing the sensitivity of the leak testing.

FIG. 1 schematically illustrates a cross-sectional view of an apparatus 10 including a foil pack 12 defining a device enclosure 14, and a fluid conduit 16 defining a fluid channel 18 and a test port 20. Foil pack 12 may include a lower pack section 58 and an upper pack section 60. Fluid channel 18 is configured to define a flow path allowing a flow of a fluid between device enclosure 14 through test port 20. In examples, fluid channel 18 is configured to establish fluid communication between test port 20 and device enclosure 14. In examples, fluid channel 18 includes fluid channel opening 22 opening into device enclosure 14. Apparatus 10 further includes a scaffolding 24 within fluid channel 18. In FIG. 1, foil pack 12 and fluid conduit 16 are depicted as a cross-section with a cutting plane parallel to the page.

Foil pack 12 substantially surrounds device enclosure 14 and substantially forms a boundary between device enclosure 14 and an environment surrounding foil pack 12. In an example, foil pack 12 includes a device enclosure wall 28 defining an inner enclosure surface 30 on a first side of device enclosure wall 28 and an outer enclosure surface 32 on a second side of device enclosure wall 28 opposite the first side. Inner enclosure surface 30 is in fluid communication with device enclosure 14 and may substantially define the boundary of device enclosure 14. In example, inner enclosure surface 30 is configured to fluidly isolate device enclosure 14 from outer enclosure surface 30.

Device enclosure 14 is configured to contain energy storage device 26. In examples, lower pack section 58 and an upper pack section 60 may be joined, and/or fluid conduit 16 to enclose (e.g., hermetically seal or substantially hermetically seal) energy storage device 26 within device enclosure 14. Energy storage device 26 is configured to provide electrical energy to components outside of device enclosure 14 using, for example, first conductor 34 and/or second conductor 36. Device enclosure 14 may be configured such that first conductor 34 and/or second conductor 36 extend through device enclosure wall 28 from inner enclosure surface 30 to outer enclosure surface 32. In examples, energy storage device 26 includes at least a first electrode plate 38 and a second electrode plate 40. First conductor 34 may be electrically connected to first electrode plate 38. Second conductor 36 may be electrically connected to second electrode plate 40.

Apparatus 10 is configured provide a flow path through which a fluid (e.g., a gas) may be withdrawn from device enclosure 14. The fluid may be withdrawn to conduct, for example, leak testing of device enclosure 14. Apparatus 10 is configured such that withdrawal of the fluid from device enclosure 14 via fluid channel 18 generates a vacuum within device enclosure 14 relative to an environment surrounding an exterior of foil pack 12. For example, the vacuum may be generated by using a test line (e.g., test line 54) engaged with test port 20 to withdraw fluid from fluid channel 18. Apparatus 10 is configured such that scaffolding 24 resists an inward deflection of fluid conduit 16 when a vacuum is established within fluid channel 18 and device enclosure 14 (e.g., when a vacuum is established relative to a pressure acting on outer conduit surface 48 and/or outer enclosure surface 32). Scaffolding 24 may allow greater vacuum to be established within fluid conduit 16 and device enclosure 14 during the leak testing. Increasing the vacuum applied may serve to increase the sensitivity of the leak testing conducted.

Fluid conduit 16 defines fluid channel 18 and test port 20. Fluid channel 18 may be defined to establish fluid communication between test port 20 and device enclosure 14. In an example, fluid conduit 16 defines fluid channel 18 such that a flow of fluid may flow from device enclosure 14, through fluid channel 18, and through test port 20 (e.g., during leak testing of device enclosure 14). In an example, fluid conduit defines fluid channel 18 such that a flow of fluid may flow from test port 20, through fluid channel 18, and to device enclosure 14 (e.g., during an electrolyte fill of energy storage device 26. In an example, fluid conduit 16 defines a fluid channel opening 22 providing fluid communication between fluid channel 18 and device enclosure 14.

Fluid conduit 16 substantially surrounds fluid channel 18 and substantially forms a boundary between fluid channel 18 and an environment surrounding fluid conduit 16. In an example, fluid conduit 16 includes a conduit wall 44 defining an inner conduit surface 46 on a first side of conduit wall 44 and an outer conduit surface 48 on a second side of conduit wall 44 opposite the first side. Inner conduit surface 46 is in fluid communication with fluid channel 18 and may substantially define the boundary of fluid channel 18. In an example, inner conduit surface 46 is configured to fluidly isolate fluid channel 18 from outer conduit surface 48.

Test port 20 defines a flow path allowing a fluid to flow between fluid channel 18 and an environment surrounding apparatus 10. Test port 20 defines the flow path through conduit wall 44. In examples, fluid conduit 16 defines test port 20 having a test port inlet 50 opening to outer conduit surface 48 and having test port outlet 52 opening to inner conduit surface 46. Apparatus 10 may be configured to allow a fluid to flow from device enclosure 14, through fluid channel opening 22, through at least some portion of fluid channel 18, through test port outlet 52, and through test port inlet 50 (e.g., during leak testing of device enclosure 14). Apparatus 10 may be configured to allow a fluid to flow from test port inlet 50, through test port outlet 52, through at least some portion of fluid channel 18, through fluid channel opening 22, and into device enclosure 14 (e.g., during electrolyte fill of energy storage device 26).

Test port 20 may be configured to allow a flow of a fluid through test port 20 to test line 54. In examples, test port 20 (e.g., test port inlet 50) is configured to establish fluid communication with a test line 54. Test line 54 may be configured to withdraw a fluid (e.g., a gas) from fluid channel 18 and device enclosure 14 via test port 20. Test line 54 may be configured to withdraw the fluid using, for example, testing apparatus 56. In examples, apparatus 10 is configured such that, when the fluid is withdrawn from fluid channel 18 and device enclosure 14 via test port 20, a pressure in device enclosure 14 decreases. In an example, apparatus 10 defines fluid channel 18 and device enclosure 14 such that fluid channel 18 and device enclosure 14 are fluidly isolated from volumes and/or defined spaces outside of fluid channel 18 and device enclosure 14, with the exception of the flow path defined by test port 20. Hence, apparatus 10 may be configured such that as test apparatus 56 removes the fluid from fluid channel 18 and device enclosure 14 via test port 20 and test line 54, test apparatus 56 draws a vacuum within fluid channel 18 and device enclosure 14 relative to a fluid environment outside of test line 54, fluid channel 18 and device enclosure 14 (e.g., a fluid environment in fluid communication with outer conduit surface 48 of fluid conduit 16 and/or outer enclosure surface 32 of foil pack 12).

Scaffolding 24 within fluid channel 18 is configured to support conduit wall 44 when a pressure differential is present between outer conduit surface 48 and inner conduit surface 46. As discussed, conduit wall 44 of fluid conduit 16 may be configured to deflect when a pressure differential is present between outer conduit surface 48 and inner conduit surface 46. For example, when a pressure within fluid channel 18 is less than a pressure external to the fluid conduit 16 (e.g., during leak testing), conduit wall 44 may deflect in a manner which tends to decrease a volume of fluid channel 18 (e.g., may tend to shrink the volume of fluid channel 18). Decreasing the volume of fluid channel 18 may lower the fluid conduction through fluid channel 18. Scaffolding 24 is configured to limit the degree to which conduit wall 44 may deflect under the pressure differential. In examples, scaffolding 24 is configured to substantially occupy the volume defined by fluid conduit 16. Scaffolding 24 is configured to maintain fluid communication between device enclosure 14 and fluid channel 18 by limiting the inward deflection of conduit wall 44 when fluid channel 18 and device enclosure 14 are under a vacuum. In examples, scaffolding 24 is configured to maintain fluid communication between device enclosure 14 and test port 20 via fluid channel 18. Hence, scaffolding 24 is configured to resist a collapse of fluid channel 18 due to an inward deflection of conduit wall 44. In examples, scaffolding 24 may be configured to limit a decrease in the volume of fluid channel 18 when conduit wall 44 deflects inward. For example, scaffolding 24 may be configured to limit the decrease in volume to 30%, 20%, 10%, or some other percent when conduit wall 44 deflects inward. The support provided to conduit wall 44 by scaffolding 24 may allow a greater vacuum to be established in fluid channel 18 and device enclosure 14, and may increase a sensitivity of leak testing conducted by establishing a vacuum within device enclosure 14.

In examples, scaffolding 24 comprises a porous material having a porosity (e.g., having interconnected pores) which allows a fluid to flow from device enclosure 14 to fluid channel 18 using the interconnected pores. In examples, the porous material allows a fluid to flow from device enclosure 14 to test port 20. In some examples, scaffolding 24 comprises a substantially rigid frame defining one or more flow passages configured to allow a fluid to flow from device enclosure 14 to fluid channel 18 through the flow passages. In examples, scaffolding 24 is configured to maintain the fluid communication between fluid channel 18 and device enclosure 14 when conduit wall 44 contacts scaffolding 24. For example, conduit wall 44 may be configured to deflect inward and substantially shrink around scaffolding 24 when a vacuum is established in fluid channel 18. Scaffolding 24 may be configured to maintain the fluid communication between fluid channel 18 and device enclosure 14 when conduit wall 44 substantially shrinks around scaffolding 24.

In some examples, scaffolding 24 may be contiguous with separator 42. That is, some portion of scaffolding 24 may extend through fluid channel opening 22 into device enclosure 14 and insert between first electrode plate 38 and second electrode plate 40. The portion of scaffolding 24 between first electrode plate 38 and second electrode plate 40 may be configured similarly to and operate in the same manner as that discussed for separator 42. In other examples, scaffolding 24 is a separate, discrete component from separator 42.

Thus, apparatus 10 is configured to allow leak testing of foil pack 12 (e.g., device enclosure 14) using test port 20 and fluid channel 18. Foil pack 12 may be configured to allow leak testing of device enclosure 14 when energy storage device 26 is positioned within device enclosure 14. Foil pack 12 may configured to allow leak testing in order to evaluate the fluid isolation between inner enclosure surface 30 and outer enclosure surface 32 provided by device enclosure wall 28. For example, outer enclosure surface 32 of foil pack 12 may be surrounded with a test gas such as helium (He) with test line 54 fluidly connected to test port 20. Test line 54 may provide a flow path (via test port 20) for a fluid to flow from fluid channel 18 and device enclosure 14 to test apparatus 56. Test apparatus 56 may be used to withdraw fluid from fluid channel 18 and device enclosure 14 and draw a vacuum (e.g., using a vacuum pump (not shown)) in fluid channel 18 and device enclosure 14 relative to the test gas surrounding outer enclosure surface 32 of foil pack 12. Drawing the vacuum via test port 20 and fluid channel 18 establishes a vacuum in device enclosure 14 and fluid channel 18. With the vacuum in device enclosure 14 relative to the test gas environment surrounding outer enclosure surface 32, the fluid isolation provided by device enclosure wall 28 may be evaluated by analyzing the gas withdrawn from device enclosure 14. The presence of the test gas in the gas withdrawn from device enclosure 14 may serve as an indication that gas leakage is occurring into device enclosure 14. For example, as will be discussed, the presence of the test gas may indicate leakage through a defined pack boundary 62 between a lower pack section 58 and an upper pack section 60, through an electrode boundary 64 between first electrode 34 and device enclosure wall 28, and/or through an electrode boundary 66 between second electrode 36 and device enclosure wall 28.

In some examples, fluid conduit 16 includes a section 68 defining test port 20 ("test port section 68"). For example, test port 20 may be defined by a hole within test port section 68 and extending between outer conduit surface 48 and inner conduit surface 46. Scaffolding 24 may be configured to extend at least from device enclosure 14 to test port section 68. Scaffolding 24 may be configured to resist an inward deflection of a portion of conduit wall 44 comprising test port section 68. In examples, scaffolding 24 is configured to limit movement of test port section 68 toward fluid channel 18 when a force in a direction from outer conduit surface 48 toward inner conduit surface 46 is applied to test port section 68. For example, scaffolding 24 may be configured to limit movement of test port section 68 when a line fitting 70 on an end of test line 54 applies a force in a direction from outer conduit surface 48 toward inner conduit surface 46 on test port section 68. In some examples, test port 20 may be configured to establish fluid communication with test line 54 using a contact pressure between line fitting 70 and test port section 68. For example, line fitting 70 may be configured to provide an O-ring seal with test port section 68 using a contact pressure. Scaffolding 24 may be configured to limit movement of test port section 68 when line fitting 70 generates a force on test port section 68 to establish the contact pressure.

Test port section 68 may define test port 20 in any manner sufficient to provide fluid communication between fluid channel 18 and an environment outside fluid channel 18 (e.g., test line 54). In examples, test port 20 is an opening extending from outer conduit surface 48 to inner conduit surface 46. Test port section 68 may define test port 20 such that a patch may be placed over test port 20 and attached to test port section 68 (e.g., a portion of outer conduit surface 48) to block flow from fluid channel 18 via test port 20. Fluid conduit 16 may be configured such that, when flow is blocked via test port 20 (e.g., when a patch is placed over test port 20), fluid channel 18 is fluidly isolated from an environment outside of fluid channel 18 or device enclosure 14. The patch may be attached to test port section 68 to substantially block flow through test port 20 by heat sealing, adhesives, fasteners, soldering, or any other suitable method.

Foil pack 12 may be configured to maintain components of energy storage device 26 in a configuration whereby energy device 26 may supply and/or receive electrical energy via first conductor 34 and second conductor 36. For example, energy storage device 26 may be a battery or a capacitor configured to supply and/or receive electrical energy via first conductor 34 and second conductor 36 when first electrode plate 38 and second electrode plate 40 are separated by a separator 42. Foil pack 12 may define device enclosure 14 to maintain separator 42 between first electrode plate 38 and second electrode plate 40. Foil pack 12 may define device enclosure 14 such that device enclosure 14 substantially prevents first electrode plate 38, second electrode plate 40, and/or separator 42 from assuming a position whereby separator 42 is not between first electrode plate 38 and second electrode plate 40. In examples, first conductor 34, second conductor 28, and separator 42 are planar components, and foil pack 12 defines device enclosure 14 such that first conductor 34, second conductor 28, and separator 42 are maintained substantially parallel to one another with separator 42 between first electrode plate 38 and second electrode plate 40. In examples, first electrode plate 38, second electrode plate 40, and separator 42 form a rolled configuration wherein each of first electrode plate 38, second electrode plate 40, and separator 42 are rolled around a mutual axis with separator 42 between first electrode plate 38 and second electrode plate 40, and foil pack 12 defines device enclosure 14 such that first conductor 34, second conductor 28, and separator 42 substantially maintain the rolled configuration.

In examples, energy storage device 26 is a battery configured to utilize first electrode plate 38 as an anode plate and second electrode plate 40 as a cathode plate, and separator 42 may be a solid or semi-solid electrolyte. In examples, separator 42 may be a porous material configured to allowing fluid communication between first electrode plate and second electrode plate 40 via, for example, a liquid electrolyte. In some examples, energy storage device 26 is a capacitor and separator 42 includes a solid, semi-solid, or liquid dielectric material.

In examples, foil pack 12 includes lower pack section 58 and upper pack section 60, with upper pack section 60 joined to lower pack section 58 at pack boundary 62. Lower pack section 58 and upper pack section 60 may be configured to define device enclosure 14 when upper pack section 60 is joined to lower pack section 58 at boundary 62. Upper pack section 60 and lower pack section 58 may be joined by, for example, heat sealing, in order to form boundary 62. Other joining methods such as adhesives, solders, pressing, and/or contact welding may be used in other examples. As previously discussed, when a test gas surrounds an exterior of foil pack 12 and a vacuum is established in device enclosure 14, the presence of the test gas in the gas withdrawn from device enclosure 14 may serve as an indication that gas leakage may be occurring into device enclosure 14 through boundary 62.

In examples, with device 26 positioned within device enclosure 14, first conductor 34 and/or second conductor 36 extend through device enclosure wall 28 of foil pack 12. Foil pack 12 may include an electrode boundary 64 where device enclosure wall 28 meets first conductor 34, and may include an electrode boundary 66 where device enclosure wall 28 meets second conductor 36. Electrode boundary 64 and electrode boundary 66 are configured to prevent a fluid flow from occurring through electrode boundary 64 and electrode boundary 66. Electrode boundary 64 and/or electrode boundary 66 may be formed by, for example, heat sealing a portion of device enclosure wall 28 around first conductor 34 and/or second conductor 36 to form electrode boundary 64 and/or electrode boundary 66. Other methods such as adhesives, solders, pressing, and/or contact welding may be used in other examples. As previously discussed, when a test gas surrounds an exterior of foil pack 12 and a vacuum is established in device enclosure 14, the presence of the test gas in the gas withdrawn from device enclosure 14 may serve as an indication that gas leakage may be occurring into device enclosure 14 through electrode boundary 64 and/or electrode boundary 66.

Apparatus 10 may be configured to allow a fluid supplied via test port 20 to flow through fluid channel 18 and into device enclosure 14 via fluid channel opening 22. For example, apparatus 10 may be configured to receive a flow of electrolyte through test port 20 and supply the electrolyte to device enclosure 14. Device enclosure 14 and/or foil pack 12 may be configured to hold first electrode plate 38 and second electrode plate 40 in relative positions whereby the electrolyte supplied via fluid channel 18 permeates separator 42, such that the electrolyte is between first electrode plate 38 and second electrode plate 40. Scaffolding 24 may be configured to allow the fluid to flow via test port 20 into device enclosure 14. In examples, scaffolding 24 is configured to allow the fluid to flow into device enclosure 14 through a network of interconnected pores within scaffolding 24. In examples, scaffolding 24 is configured to allow the fluid to flow into device enclosure 14 through one or more flow passages defined by a rigid frame member of scaffolding 24.

In examples, apparatus 10 is configured to allow a fluid to flow from device enclosure 14 to test port 20 via fluid channel 18 when energy storage device 26 is in electrical communication with external circuitry. For example, apparatus 10 may be configured to allow a fluid (e.g., a gas) to flow to test port 20 when first conductor 34 and second conductor 36 are in electrical communication with external circuitry providing a charging current to energy storage device 26 via first conductor 34 and second conductor 36. Fluid channel 18 may be configured to substantially vent gases generated within device enclosure 14 when the external circuitry provides the charging current (e.g., for an initial charge of energy storage device 26). Scaffolding 24 may be configured to allow the fluid (e.g., the gas) to flow from device enclosure 14 to test port 20. In examples, scaffolding 24 is configured to allow the fluid to flow from device enclosure 14 through a network of interconnected pores within scaffolding 24. In examples, scaffolding 24 is configured to allow the fluid to flow from device enclosure 14 through one or more flow passages defined by a rigid frame member of scaffolding 24.

Figure 2:
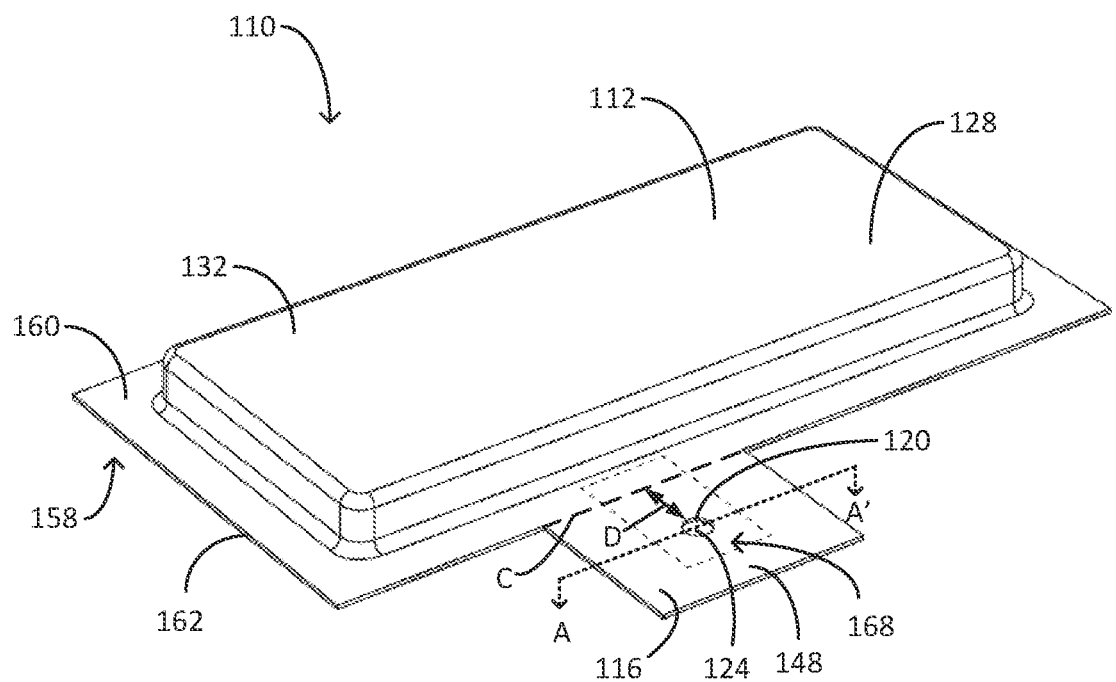
FIG. 2 is a perspective view of an example apparatus including a scaffolding.

FIG. 2 illustrates a perspective view of an apparatus 110. Apparatus 110 is an example of apparatus 10. Apparatus 110 includes foil pack 112, fluid conduit 116 defining a test port 120, scaffolding 124, enclosure wall 128, outer enclosure surface 132, outer conduit surface 148, lower pack section 158, upper pack section 160, pack boundary 162, and test portion section 168, which may be configured individually and relative to each other in the same manner as the like-named components of apparatus 10 (FIG. 1). Foil pack 112 defines a device enclosure (not shown), and fluid conduit 112 defines a fluid channel (not shown) establishing fluid communication between test port 120 and the device enclosure. Foil pack 112 may include one or more conductors (e.g., first conductor 34 and/or second conductor 36) (not shown) extending through enclosure wall 128.

Fluid conduit 116 is a substantially elongated arm defining the fluid channel (not shown) and containing scaffolding 124 within the fluid channel. As before, fluid conduit 115 defines the fluid channel to provide fluid communication between test port 120 and the device enclosure defined by foil pack 112. Apparatus 110 is configured to allow leak testing of the device enclosure using fluid conduit 116 and test port 120.

In an example, fluid conduit 116 extends from foil pack 112 and provides a displacement D along fluid conduit 116 between test port 120 and foil pack 112. Fluid conduit 116 may be configured to allow separation of fluid conduit 116 and foil pack 112. In examples, apparatus 110 generally defines a cutting line C between separating fluid conduit 116 and foil pack 112, such that apparatus 110 may be cut along cutting line C to substantially separate fluid conduit 116 from foil pack 112. Cutting line C is illustrated for reference in FIG. 2, however apparatus 110 may define cutting line C at any location between test port 120 and foil pack 112. A portion of fluid channel 118 may remain (e.g., fluid channel opening 22 (FIG. 1)) when fluid conduit 116 is substantially removed via separation long cutting line C. Foil pack 112 may be configured to seal the remaining portion of fluid channel 118 in order to fluidly isolate the device enclosure within foil pack 112 from outer enclosure surface 32 of foil pack 112. In examples, a first portion of foil pack 112 (e.g., a portion of lower pack section 158) may be joined with a second section of foil pack 112 (e.g., a portion of upper pack section 160) to seal the remaining portion of fluid channel 118. The first portion and second portion of foil pack 112 may be joined by heat sealing, adhesives, solders, pressing, contact welding, or other suitable methods.

Figure 3:
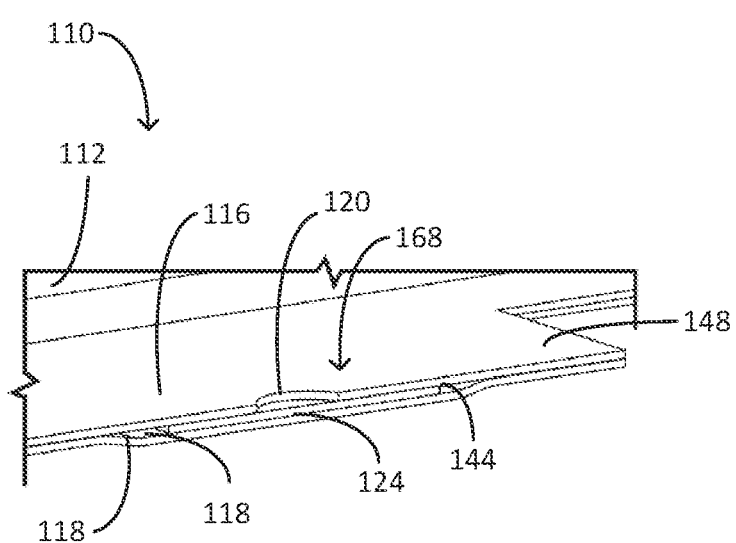
FIG. 3 is a perspective view of the apparatus of FIG. 2.

FIG. 3 depicts a portion of apparatus 110 showing a cross-section taken along the cutting plane A-A' of FIG. 2 (intersecting test port 120). In addition to foil pack 112, fluid conduit 116, a test port 120, scaffolding 124, outer conduit surface 148, and test portion section 168, FIG. 3 illustrates fluid channel 118 defined by fluid conduit 116 and scaffolding 124 within fluid channel 118. FIG. 3 further illustrates conduit wall 144 and inner conduit surface 146 of fluid conduit 116. Fluid channel 118, conduit wall 144, and inner conduit surface 146 are examples of fluid channel 18, conduit wall 44, and inner conduit surface 46 respectively of apparatus 10 (FIG. 1).

As before, scaffolding 124 is configured to support conduit wall 144 when a pressure differential is present between outer conduit surface 148 and inner conduit surface 146. For example, when a pressure within fluid channel 118 is less than a pressure external to the fluid conduit 116 (e.g., during leak testing), conduit wall 144 may deflect in a manner which tends to decrease a volume of fluid channel 118. Scaffolding 124 is configured to limit the degree to which conduit wall 144 may deflect under the pressure differential. Further, scaffolding 124 is configured to maintain fluid communication between the device enclosure (not shown) defined by foil pack 112 and fluid channel 118 by limiting the inward deflection of conduit wall 144. In examples, scaffolding 124 is configured to maintain fluid communication between the device enclosure defined by foil pack 112 and test port 120. Additionally, scaffolding 124 may be configured to extend at least from the device enclosure to test port section 168 defining test port 120. Scaffolding 124 is configured to resist an inward deflection of test port section 168 when a force is applied to test port section 168 in a direction from outer conduit surface 148 to inner conduit surface 146.

Figure 4:
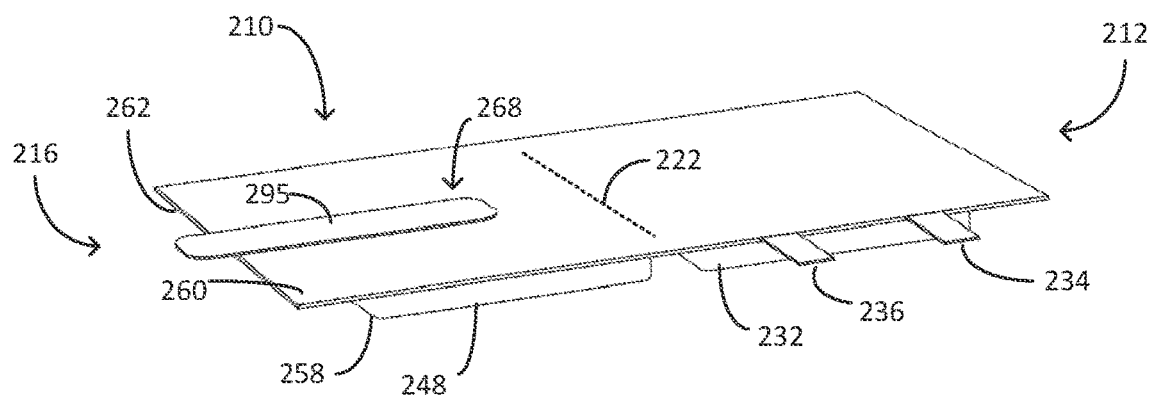
FIG. 4 is a perspective view of an apparatus including a scaffolding enclosure.
Figure 5:
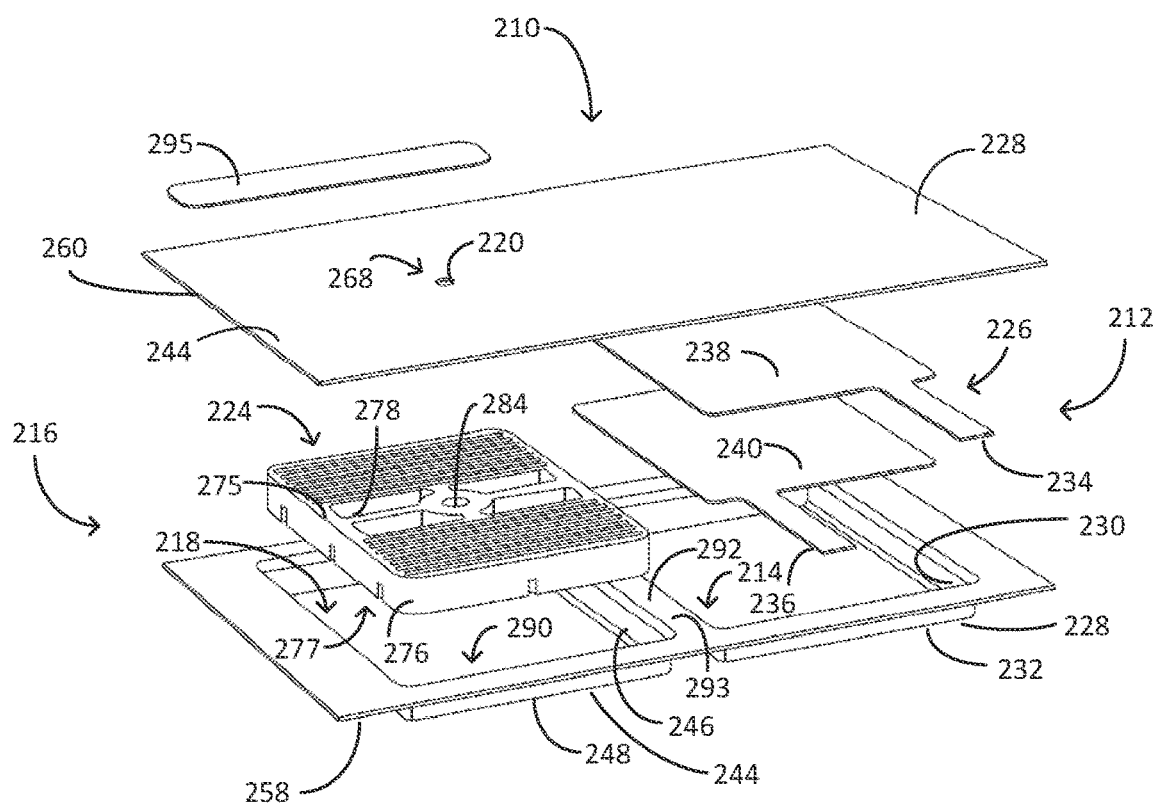
FIG. 5 is an exploded view of the apparatus of FIG. 4.

FIG. 4 illustrates a perspective view of an apparatus 210. FIG. 5 illustrates an exploded view of apparatus 210. Apparatus 210 is an example of apparatus 10 and apparatus 110. Apparatus 210 includes foil pack 212, device enclosure 214, fluid conduit 216, fluid channel 218, test port 220, fluid channel opening 222 (shown in hidden lines), scaffolding 224, device enclosure wall 228, inner enclosure surface 230, outer enclosure surface 232, first conductor 234, second conductor 236, first electrode plate 238 and second electrode plate 240 forming a portion of energy storage device 226, conduit wall 244, inner conduit surface 246, outer conduit surface 248, lower pack section 258, upper pack section 260, pack boundary 262, and test port section 268, which may be configured individually and relative to each other in the same manner as the like-named components of apparatus 10 (FIG. 1) and apparatus 110 (FIGS. 2, 3). In the exploded view of FIG. 5, and as illustrated, device enclosure wall 228 and conduit wall 244 each comprise portions of lower pack section 258 and upper pack section 260. Lower pack section 258 and upper pack section 260 may be joined (e.g., heat sealed) to define device enclosure 214 and fluid conduit 216.

Fluid conduit 216 defines fluid channel 218 (FIG. 4). Fluid channel 218 may be configured to define a flow path allowing allow a flow of a fluid from device enclosure 214 through test port 220. In examples, fluid channel 218 is configured to establish fluid communication between test port 220 and device enclosure 214. Scaffolding 224 within fluid channel 218 is configured to support conduit wall 244 when a pressure differential is present between outer conduit surface 248 and inner conduit surface 246. For example, when a pressure within fluid channel 218 is less than a pressure acting on outer conduit surface 248 (e.g., during leak testing), conduit wall 244 may deflect in a manner (e.g., inward toward scaffolding 224) which tends to decrease a volume of fluid channel 218. Scaffolding 224 is configured to limit the degree to which conduit wall 244 may deflect under the pressure differential. Scaffolding 224 may be configured to maintain fluid communication between device enclosure 214 and fluid channel 218 by limiting the inward deflection of conduit wall 244 when fluid channel 218 and device enclosure 214 are under a vacuum. In examples, scaffolding 224 is configured to maintain fluid communication between device enclosure 214 and test port 220 via fluid channel 218.

Figure 6:
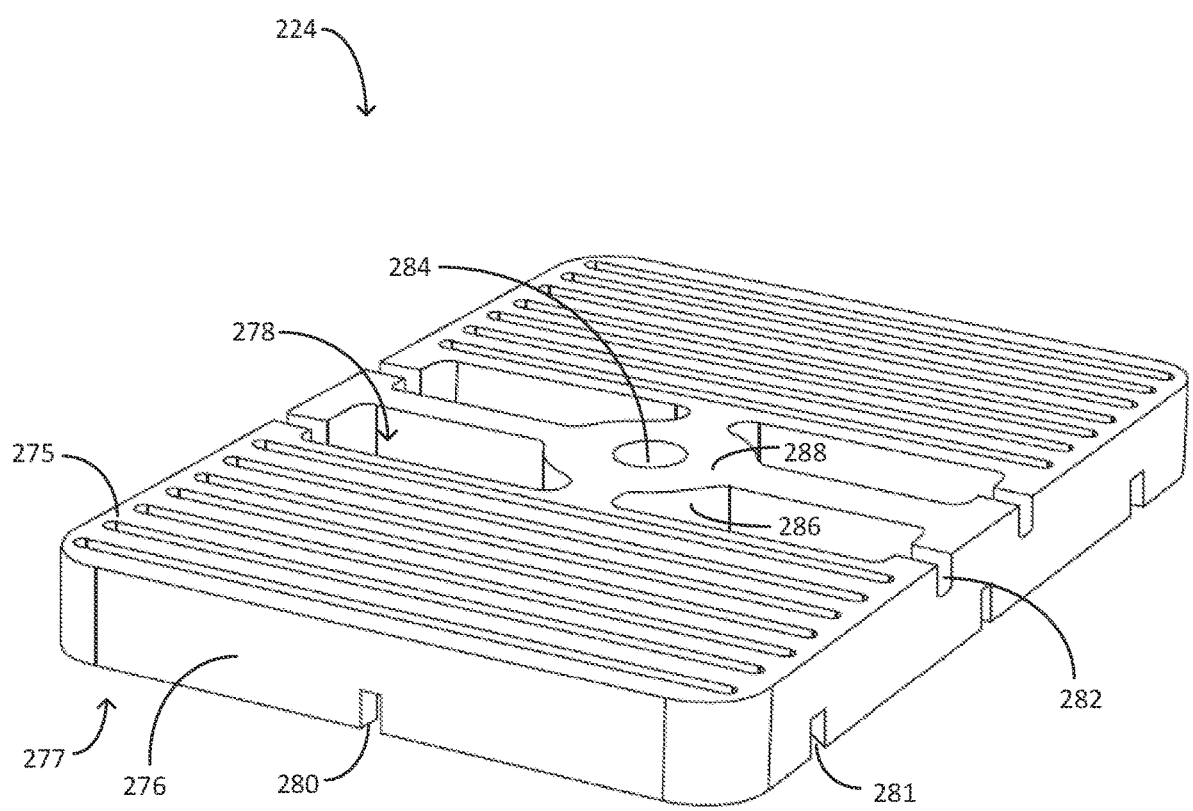
FIG. 6 is perspective view of an example scaffolding.

FIG. 6 illustrates a perspective view of scaffolding 224 of apparatus 210. Scaffolding 224 may be a substantially rigid frame member configured to exert a reaction force on conduit wall 244 when conduit wall 244 deflects inwards and contacts scaffolding 224. Scaffolding 224 may comprise a relatively impermeable material (e.g., substantially lacking an interconnected pore network) such as polypropylene molded or otherwise formed to exert the reaction force on conduit wall 244 when conduit wall 244 deflects inwards and contacts scaffolding 224.

In examples, scaffolding 224 includes a scaffolding wall 276 substantially surrounding an interior region 278 of scaffolding 224 ("scaffolding interior region 278"). Scaffolding 224 defines one or more flow passages configured to allow a flow of fluid into interior region 278 through scaffolding wall 276. For example, scaffolding 224 may be configured to allow a flow of fluid into scaffolding interior region 278 through one or more of flow inlet 280, flow inlet 281, and/or flow inlet 282. Scaffolding 224 defines the one or more flow passages such that the fluid may flow through scaffolding interior region 278 to one or more flow outlets such as flow outlet 284. Flow inlets 280, 281, 282 and flow outlet 284 are open areas defined by scaffolding 224 and configured to receive and/or issue a flow of fluid. Scaffolding 224 may be configured such that flow outlet 284 substantially aligns with test port 220 when conduit wall 244 deflects inward and/or contacts scaffolding 224. That is, in some examples, flow outlet 284 is configured such, when scaffolding 224 resides within fluid channel 218, a directional vector may pass from flow outlet 284 to test port 220 without intersecting a portion of conduit wall 244. Scaffolding 224 may be configured to allow a fluid to flow into flow outlet 284, through scaffolding interior region 278, and issue from one or more of flow inlets 280, 281, 282.

Scaffolding 224 may include an upper scaffolding surface 275 and a lower scaffolding surface 277 opposite upper scaffolding surface 275. Scaffolding 224 may be configured such that scaffolding wall 276 separates upper scaffolding surface 275 and lower scaffolding surface 277. In examples, upper scaffolding surface 275 and/or lower scaffolding surface 277 at least partially surround one or more open areas, such as flow outlet 284. In examples, upper scaffolding surface 275 and/or lower scaffolding surface 277 are substantially defined within a geometric plane (e.g., a geometric plane substantially perpendicular to scaffolding wall 276). In some examples, upper scaffolding surface 275 is substantially defined within a first geometric plane and lower scaffolding surface 277 is substantially defined within a second geometric plane. The second geometric plane may be substantially parallel to the first geometric plane. In some examples, scaffolding wall 276 extends between the first geometric plane and the second geometric plane.

Scaffolding 224 may be a substantially rigid member configured to resist deformation when conduit wall 244 contacts and exerts a force on scaffolding 224. For example, when a pressure on outer conduit surface 248 exceeds a pressure on inner conduit surface of fluid conduit 216 causing conduit wall 244 to deflect inwards and exert a force on scaffolding 224, scaffolding 224 is sufficiently rigid to resist deforming in response to the exerted force. In similar manner, scaffolding 224 may be a substantially rigid member configured to resist deformation when test port section 268 exerts a force on scaffolding 224. For example, when a test line (e.g., test line 54 (FIG. 1)) exerts of force on test port section 268 causing test port section 268 to transmit the force to scaffolding 224, scaffolding 224 is sufficiently rigid to resist deforming in response to the transmitted force. In some examples, scaffolding 224 includes a reinforcing collar 286 surrounding flow outlet 284 and configured to exert a reaction force opposite the force transmitted by test port section 268. Reinforcing collar 286 may define a substantially annular face 288. Annular face 288 may be configured to receive a force generated by a substantially tubular member. For example, annular face 288 may be configured to receive a force generated when fitting 70 (FIG. 1) establishes a contact pressure with test portion section 68.

Returning to FIGS. 4, 5, fluid conduit 216 is configured to substantially enclose scaffolding 224 within fluid channel 218 (e.g., substantially enclosure scaffolding 224 when lower pack section 258 and upper pack section 260 join to form pack boundary 262). In examples, fluid conduit 216 defines a scaffolding enclosure 290 configured to hold scaffolding 224. In examples, scaffolding enclosure 290 is configured to position scaffolding 224 such that a fluid may flow from device enclosure 214, through fluid channel 218 and through test port 220, For example, fluid conduit 216 may be configured to allow a fluid to flow from device enclosure 214, through a flow inlet of scaffolding 224 (e.g., flow inlet 280, 281, 282 (FIG. 6)), through scaffolding interior region 278, through a flow outlet of scaffolding 224 (e.g., flow outlet 284), and through test port 220. In examples, inner conduit surface 246 defines scaffolding enclosure 290. Inner conduit surface 246 may define scaffolding enclosure 290 to substantially conform to a circumferential shape defined by scaffolding wall 276. For example, scaffolding wall 276 may define a substantially rectangular or other polygonal circumferential shape, and inner conduit surface 256 may define scaffolding enclosure 290 to substantially conform to the substantially rectangular or other polygonal circumferential shape. Scaffolding wall 276 may define a circumferential shape including curvatures, and inner conduit surface 256 may define scaffolding enclosure 290 to substantially conform to the curvatures.

In some examples, fluid conduit 216 defines scaffolding enclosure 290 such that, when pack lower portion 258 is joined with upper pack section 260 to form pack boundary 262, lower scaffolding surface 277 substantially faces pack lower portion 258 and upper scaffolding surface 275 substantially faces upper pack section 260. In some examples, when pack lower portion 258 is joined with upper pack section 260 to form pack boundary 262, upper scaffolding surface 275 is between test port 220 and lower scaffolding surface 277.

Apparatus 210 (e.g., lower pack section 258) may define a separation wall 292 between scaffolding enclosure 290 and device enclosure 214. Separation wall 292 may define a portion of fluid channel opening 222 (shown in hidden lines in FIG. 4) establishing fluid communication between device enclosure 214 and fluid channel 218. In an example, when pack lower portion 258 is joined with upper pack section 260 to form pack boundary 262, some portion of separation wall 292 and some portion of pack upper section 260 define fluid channel opening 222. Fluid channel opening 222 may be an area substantially between upper pack section 260 and separation wall 292 configured to allow a flow from device enclosure 214 to fluid channel 218, and vice-versa. In examples, lower pack section 258 and upper pack section 260 are joined to form pack boundary 262 substantially around an outer periphery of apparatus 210, and pack upper section 260 and separation wall 292 define fluid channel opening 222 configured to allow a flow of fluid from device enclosure 214 to fluid channel 218.

In examples, apparatus 210 is configured for separation of foil pack 212 and fluid conduit 216, such that scaffolding enclosure 290 (and scaffolding 224) may be entirely separated from device enclosure 214 (and energy storage device 226). Apparatus 210 may be configured such that, when upper pack section 260 and lower pack section 258 form pack boundary 262, foil pack 212 and fluid conduit 216 may be separated by cutting upper pack section 260 and lower pack section 258 generally in the vicinity of separation wall 292 (e.g., generally along fluid channel opening 222 (FIG. 4). In examples, apparatus 210 is configured such that fluid channel opening 222 may be sealed to fluidly isolate device enclosure 214 from outer enclosure surface 232 of foil pack 212 either before or after separating fluid conduit 216 and foil pack 212. In examples, a portion of foil pack 212 (e.g., a portion of lower pack section 258) may be joined with a second section of foil pack 212 (e.g., a portion of upper pack section 260) to seal fluid channel opening 222. In examples, an upper surface 293 of separation wall 292 is configured to join with upper pack section 260 to seal fluid channel opening 222. The first portion and second portion of foil pack 212 may be joined by heat sealing, adhesives, solders, pressing, contact welding, or other suitable methods.

In examples, apparatus 210 includes a sealing portion 295 configured to cover test port 220. Sealing portion 295 may be configured to fluidically isolate scaffolding enclosure 290 and device enclosure wall 228 when sealing portion 295 covers test port 220. In examples, sealing portion 295 is configured to join with conduit wall 244 to cover test port 220. Sealing portion 295 and conduit wall 244 may be joined by heat sealing, adhesives, solders, pressing, contact welding, or other suitable methods.

Hence, apparatus 210 is configured to allow leak testing of foil pack 212 (e.g., device enclosure 214) using test port 220 and fluid channel 218. Foil pack 212 may be configured to allow leak testing of device enclosure 214 when energy storage device 226 is positioned within device enclosure 214. Foil pack 212 may configured to allow leak testing in order to evaluate the fluid isolation between inner enclosure surface 230 and outer enclosure surface 232 provided by device enclosure wall 28. For example, outer enclosure surface 232 of foil pack 212 may be surrounded with a test gas such as helium (He), and a test line (e.g., test line 54 (FIG. 1)) may be fluidly connected to test port 220. The test line may be utilized to withdraw fluid from fluid channel 218 and device enclosure 214 (via fluid channel opening 222) and draw a vacuum in fluid channel 218 and device enclosure 214 (e.g., establish a vacuum relative to the test gas surrounding outer enclosure surface 232). The fluid isolation provided by device enclosure wall 228 may be evaluated by analyzing the gas withdrawn from device enclosure 214. The presence of the test gas in the gas withdrawn from device enclosure 214 may serve as an indication that gas leakage is occurring into device enclosure 214. For example, the presence of the test gas may indicate leakage through a pack boundary 262 between lower pack section 258 and upper pack section 260, through an electrode boundary between first conductor 234 and device enclosure wall 228, and/or through an electrode boundary between second conductor 236 and device enclosure wall 228. In examples, following the leak testing, fluid conduit 216 and foil pack 212 may be separated into discrete parts generally in the vicinity of separation wall 292 (e.g., generally along fluid channel opening 222). Before or after the separation, fluid channel opening 222 may be sealed to fluidly isolate device enclosure 214 from outer enclosure surface 232 of foil pack 212.

Further, apparatus 210 (FIG. 4, 5) may be configured to allow a fluid supplied via test port 220 to flow through fluid channel 218 and into device enclosure 214 via fluid channel opening 222. For example, apparatus 210 may be configured to receive a flow of electrolyte through test port 220 and supply the electrolyte to device enclosure 214. Device enclosure 214 and/or foil pack 212 may be configured to hold first electrode plate 238 and second electrode plate 240 in relative positions such that the electrolyte flows between (or permeates a separator between) first electrode plate 238 and second electrode plate 240. Scaffolding 224 may be configured to allow the fluid to flow via test port 220 into device enclosure 214 one or more flow passages defined by scaffolding 224.

Figure 7:
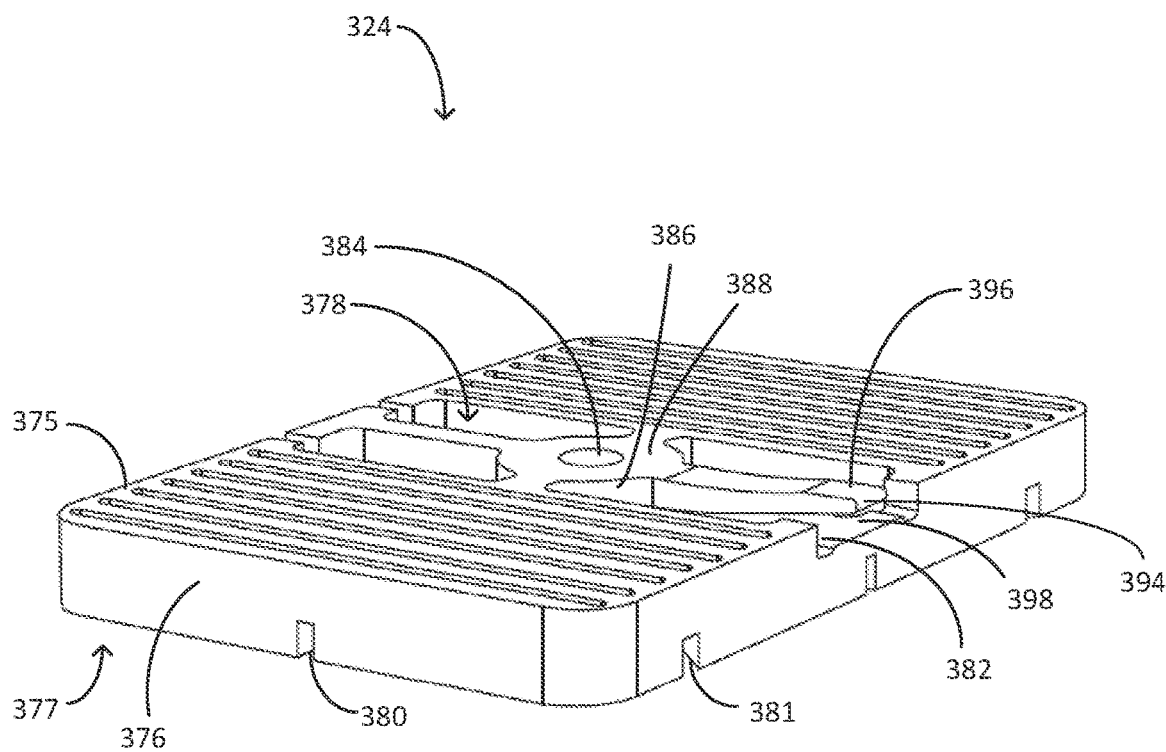
FIG. 7 is a perspective view of an example scaffolding having a support member.

FIG. 7 illustrates a scaffolding 324 configured to resist a collapse of fluid channel opening 222 (FIG. 4) due to an inward deflection of conduit wall 244. Scaffolding 324 is an example of scaffolding 24, scaffolding 124, and scaffolding 224. Scaffolding 324 includes upper scaffolding surface 375, scaffolding wall 376, lower scaffolding surface 377, scaffolding interior region 378, flow inlet 380, flow inlet 381, flow inlet 382, flow outlet 384, reinforcing collar 386, and annular face 388, which may be configured individually and relative to each other in the same manner as the like-named components of scaffolding 24, scaffolding 124, and scaffolding 224.

Scaffolding 324 includes a support member 394 configured to maintain fluid communication between fluid channel 218 and device enclosure 214 (FIG. 4, 5). In examples, support member 394 is configured to maintain the fluid communication between fluid channel 218 and device enclosure 214 when a pressure differential is present between outer conduit surface 248 and inner conduit surface 246. For example, when a pressure within fluid channel 218 and device enclosure 214 is less than a pressure acting on outer conduit surface 248 and outer enclosure surface 232 (e.g., during leak testing), one or more portions of conduit wall 244 (e.g., a portion of upper pack section 260 and/or a section of lower pack section 258) may tend to deflect inwardly in a manner which decreases an area of fluid channel opening 222, or in some cases causes a substantial closure of fluid channel opening 222. Support member 394 is configured to limit the degree to which conduit wall 244 (FIG. 4, 5) may deflect under the pressure differential and decrease the area of fluid channel opening 222. Hence, scaffolding 324 is configured to resist a collapse of fluid channel opening 222 due to an inward deflection of conduit wall 244. The support provided to conduit wall 244 by support member 394 may allow a greater vacuum to be established in fluid channel 218 and device enclosure 214, and may increase a sensitivity of leak testing conducted when a vacuum is established within device enclosure 214.

Support member 394 may be configured to substantially prevent some portion of conduit wall 244 and/or device enclosure wall 228 (e.g., a portion of upper pack section 260) from contacting another portion of conduit wall 244 and/or device enclosure wall (e.g., separation wall 292). Support member 394 may be configured to substantially prevent contact between the portions of conduit wall 244 and/or device enclosure wall 228 which define fluid channel opening 222.

Support member 394 may be configured to insert into fluid channel opening 222 when scaffolding 324 is within fluid channel 218 (e.g., within scaffolding enclosure 290). In examples, support member 394 is configured to extend substantially between separation wall 292 (FIG. 5) and upper pack section 260 when scaffolding 324 is positioned within fluid channel 218 (e.g., within scaffolding enclosure 290). Support member 394 may be configured to limit motion of upper pack section 260 when upper pack section 260 deflects inward toward scaffolding 324 and contacts support member 394. In examples, support member 394 is configured to exert a reaction force on conduit wall 244 and/or device enclosure wall 228 (e.g., on upper pack section 260) when conduit wall 244 and/or device enclosure wall 228 (e.g., upper pack section 260) exerts a force on support member 394. In some examples, support member 394 is configured to extend from some portion of scaffolding 324 within scaffolding interior region 378. In some examples, support member 394 extends from reinforcing collar 386.

Support member 394 may be configured to define a support member surface 396. Support member surface 396 may be configured to substantially face some portion of conduit wall 244 and/or device enclosure wall 228 (e.g., some portion of upper pack surface 260 or lower pack surface 258) when scaffolding 324 is positioned within fluid channel 218 (e.g., scaffolding enclosure 290). In examples, support member surface 396 is configured to insert into fluid channel opening 222 when scaffolding 324 is within fluid channel 218 (e.g., within scaffolding enclosure 290). Support member 394 may be configured to define a displacement between support member surface 396 and upper scaffolding surface 375 or lower scaffolding surface 377. For example, when upper scaffolding surface 375 is substantially defined within a geometric plane, support member 394 may be configured such that support member surface 396 is substantially displaced from (e.g., above or below) the geometric plane. When lower scaffolding surface 375 is substantially defined within a second geometric plane, support member 394 may be configured such that support member surface 396 is substantially displaced from (e.g., above or below) the second geometric plane.

Figure 8:
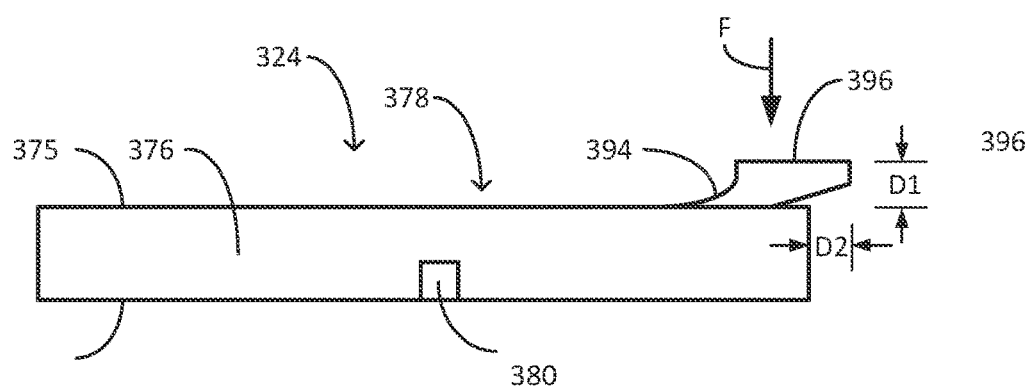
FIG. 8 is a conceptual diagram schematically illustrating the scaffolding of FIG. 7.

FIG. 8 schematically illustrates a side view of scaffolding 324 defining a displacement D1 between support member surface 396 and upper scaffolding surface 375. In examples, upper scaffolding surface 375 is substantially defined within a geometric plane perpendicular to the page in FIG. 8, and scaffolding 324 defines the displacement D1 between support member surface 396 and the geometric plane. In some examples, support member 394 is configured such that at least some portion of support member surface 396 extends over a portion of scaffolding wall 376 (e.g., over top surface 293 (FIG. 5)), as indicated by the displacement D2 in FIG. 8. In other examples, support member 394 may define support member surface 396 such that support member surface 396 defines a non-zero displacement D1, but defines the displacement D2 to be substantially zero, or in a direction opposite that shown in FIG. 8 (e.g., such that support member surface 396 resides substantially above upper scaffolding surface 375 and interior region 378 without extending over scaffolding wall 376).

Support member 394 may be resiliently-biased to define the displacement D1 between support member surface 396 and upper scaffolding surface 375. Support member 394 may be, for example, resiliently-biased such that when support member 394 is deflected to decrease the displacement D1 (e.g., depressed toward upper scaffolding surface 375) or increase the displacement D1 (e.g., pulled away from upper scaffolding surface 375), support member 394 tends to re-establish the displacement D1 once released.

Figure 9:
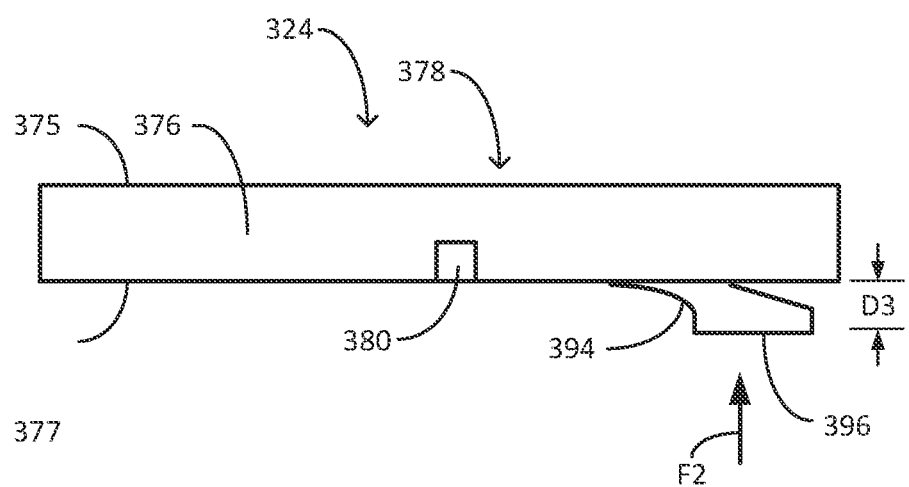
FIG. 9 is a conceptual diagram schematically illustrating another example support member.

FIG. 9 schematically illustrates a side view of scaffolding 324 defining a displacement D3 between support member surface 396 and lower scaffolding surface 377. In examples, lower scaffolding surface 377 is substantially defined within a second geometric plane perpendicular to the page in FIG. 9, and scaffolding 324 defines the displacement D3 between support member surface 396 and the second geometric plane. Support member 394 may be resiliently-biased to define the displacement D3 between support member surface 396 and lower scaffolding surface 377. Support member 394 may be resiliently-biased such that when support member 394 is deflected to decrease the displacement D3 (e.g., depressed toward lower scaffolding surface 377) or increase the displacement D3 (e.g., pulled away from lower scaffolding surface 377), support member 394 tends to re-establish the displacement D3 once released. In examples, support member 394 is configured to be depressible such that support member surface 396 substantially positions above the level of lower scaffolding surface 377. For example, from the position illustrated in FIG. 9, with support member surface 396 positioned below upper scaffolding surface 375, scaffolding 324 may be configured such that a force F2 applied to support member 394 causes support member surface 396 to translate in the direction of the force F2 and position above lower scaffolding surface 377. In an example, scaffolding wall 376 defines a support member slot configured to receive some portion of support member 394 when the force F2 is exerted on support member 394. The support member slot may be configured to cause support member 394 to position support member surface 396 above the level of lower surface 377 when the force F2 is exerted on support member 394.

Figure 10:
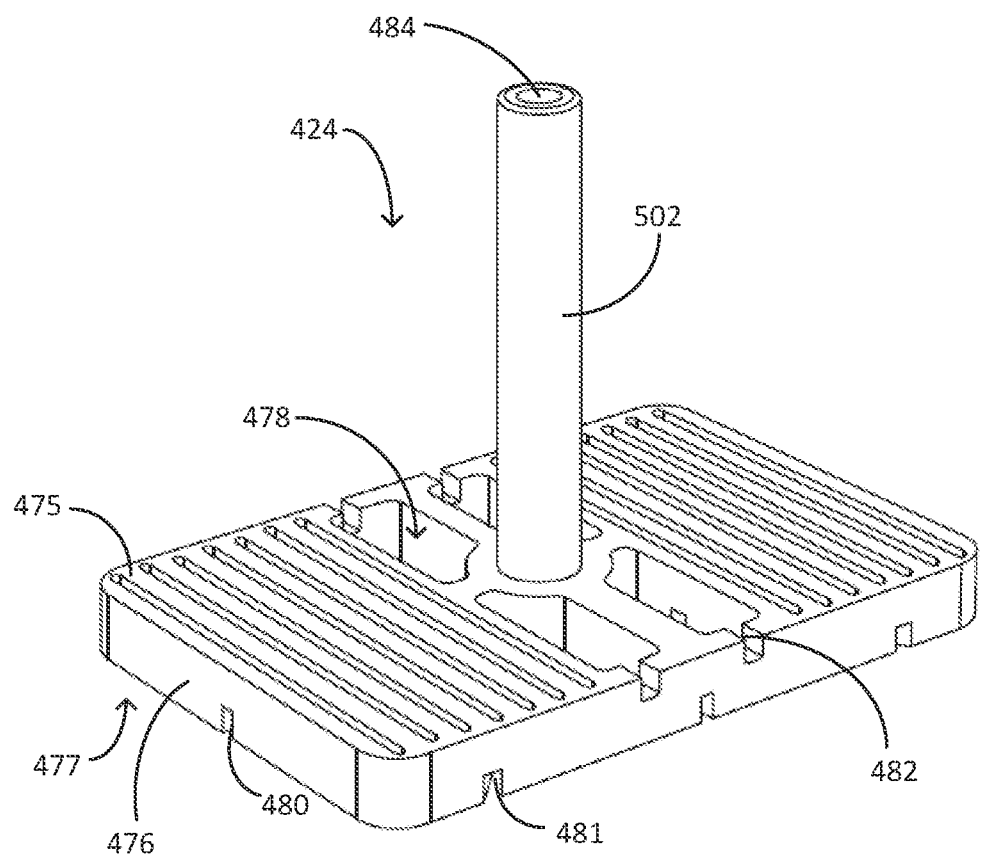
FIG. 10 is a perspective view of an example scaffolding having an extension conduit.

FIG. 10 illustrates a scaffolding 424 configured to resist a collapse of fluid channel opening 222 (FIG. 4) due to an inward deflection of conduit wall 244. Scaffolding 424 is an example of scaffolding 24, scaffolding 124, scaffolding 224, and scaffolding 324. Scaffolding 424 includes upper scaffolding surface 475, scaffolding wall 476, lower scaffolding surface 477, scaffolding interior region 478, flow inlet 480, flow inlet 481, flow inlet 482, and flow outlet 484, which may be configured individually and relative to each other in the same manner as the like-named components of scaffolding 24, scaffolding 124, scaffolding 224, and scaffolding 324.

Scaffolding 424 includes an extension conduit 502 defining flow outlet 484. Extension conduit 502 is configured to provide fluid communication between flow outlet 484 and fluid channel 218 (FIG. 4, 5). Extension conduit 502 may define a the flow path through conduit wall 244 (FIG. 4, 5). Scaffolding 424 may be configured such that, when positioned within fluid channel 218, scaffolding 424 allows a fluid to flow from device enclosure 214, through fluid channel opening 222, through at least some portion of fluid channel 218, and through flow outlet 484 (e.g., during leak testing of device enclosure 14). Scaffolding 424 may be configured such that, when positioned within fluid channel 218, scaffolding 424 allows a fluid to flow from flow outlet 484, through at least some portion of fluid channel 218, through fluid channel opening 222, and into device enclosure 214 (e.g., during electrolyte fill of energy storage device 26).

In examples, extension conduit 502 may be configured to establish fluid communication between flow outlet 484 and a test line (e.g., test line 54 (FIG. 1)). In examples, scaffolding 424 is configured such that, when positioned within fluid channel 218, a pressure in device enclosure 214 decreases when a fluid is withdrawn from fluid channel 218 and device enclosure 214 via flow outlet 484. In an example, apparatus 210 is configured such that, when scaffolding 424 is positioned within fluid channel 218, fluid channel 218 and device enclosure 214 are fluidly isolated from volumes and/or defined spaces outside of fluid channel 218 and device enclosure 214, with the exception of the flow path defined by extension conduit 502. Hence, apparatus 210 may be configured such that as a test apparatus (e.g., test apparatus 56 (FIG. 1)) removes a fluid from fluid channel 218 and device enclosure 214 via flow outlet 484 of extension conduit 502, the test apparatus draws a vacuum within fluid channel 218 and device enclosure 214 relative to a fluid environment outside of the test line, fluid channel 218 and device enclosure 214.

Extension conduit 502 may be configured to establish fluid communication between flow outlet 484 and scaffolding interior region 478 surrounded by scaffolding wall 476. Scaffolding 424 may be configured to allow a flow into flow inlet 480, flow 481, and/or flow inlet 482, into scaffolding interior region 478, and through flow outlet 484 (e.g., during leak testing of device enclosure 214 (FIG. 4, 5)). Scaffolding 424 may be configured to allow a flow from flow outlet 484, into scaffolding interior region 478, and through flow inlet 480, flow 481, and/or flow inlet 482 (e.g., during electrolyte fill of device enclosure 214).

In examples, scaffolding 424 may be configured such that, when positioned within fluid channel 218, scaffolding 424 is configured to allow a fluid to flow from device enclosure 214 to flow outlet 484 via extension conduit 502 when energy storage device 226 (FIG. 4, 5) is in electrical communication with external circuitry. For example, scaffolding 424 may be configured to allow a fluid (e.g., a gas) to flow to flow outlet 484 when first conductor 234 and second conductor 236 are in electrical communication with external circuitry providing a charging current to energy storage device 226.

Fluid conduit 216 may be configured to substantially enclose scaffolding 424 within fluid channel 218 (e.g., substantially enclosure scaffolding 224 when lower pack section 258 and upper pack section 260 join to form pack boundary 262). Fluid conduit 216 may be configured to hold scaffolding 424 within scaffolding enclosure 290. In examples, scaffolding 424 is configured such that, when scaffolding 424 is positioned in fluid channel 218, extension conduit 502 extends through test port 220. In examples, apparatus 210 includes a substantially flow-tight boundary between an outer surface 504 of extension conduit 502 ("extension outer surface 504") and a periphery of test port 220. The substantially flow-tight boundary may be configured to block a flow from flowing into or out of fluid channel 218 between extension conduit 502 and the periphery of test port 220. The substantially flow-tight boundary may be configured such that when scaffolding 424 is positioned within fluid channel 218 and extension conduit 502 extends through test port 220, fluid channel 218 and device enclosure 214 are fluidly isolated from volumes and/or defined spaces outside of fluid channel 218 and device enclosure 214, with the exception of the flow path defined by extension conduit 502.

Hence, when scaffolding 424 is positioned within fluid channel 218 and extension conduit 502 extends through test port 220, apparatus 210 is configured to allow leak testing of foil pack 212 (e.g., device enclosure 214) using flow outlet 484 and fluid channel 218. For example, outer enclosure surface 232 of foil pack 212 may be surrounded with a test gas such as helium (He), and a test line (e.g., test line 54 (FIG. 1)) may be fluidly connected to flow outlet 484. The test line may be utilized to withdraw fluid from extension conduit 502, fluid channel 218, and device enclosure 214 (via fluid channel opening 222) and draw a vacuum in fluid channel 218 and device enclosure 214 (e.g., establish a vacuum relative to the test gas surrounding outer enclosure surface 232). The fluid isolation provided by device enclosure wall 228 may be evaluated by analyzing the gas withdrawn from device enclosure 214.

When scaffolding 424 is positioned within fluid channel 218 and extension conduit 502 extends through test port 220, apparatus 210 may be configured to receive a flow of electrolyte through flow outlet 484 and supply the electrolyte to device enclosure 214. When scaffolding 424 is positioned within fluid channel 218 and extension conduit 502 extends through test port 220, apparatus 210 may be configured to allow a fluid (e.g., a gas) to flow extension conduit 502 when first conductor 234 and second conductor 236 are in electrical communication with external circuitry providing a charging current to energy storage device 226. Flow outlet 484 may be configured to substantially vent gases generated within device enclosure 214 when the external circuitry provides the charging current (e.g., for an initial charge of energy storage device 226).

Although fluid channel 218, scaffolding enclosure 290, and device enclosure 214 are depicted in FIGS. 4 and 5 as substantially rectangular shapes, device enclosure wall 228, conduit wall 244, lower pack section 258, and/or upper pack section 260 may define fluid channel 218, scaffolding enclosure 290, and/or device enclosure 214 to have any shape and any volume. Further, although scaffolding 224, 324, 424 are depicted in FIGS. 5, 6, 7, 8, 9 as substantially rectangular shapes, scaffolding 224, 324, 424 may have any shape and any volume.

Figure 12:
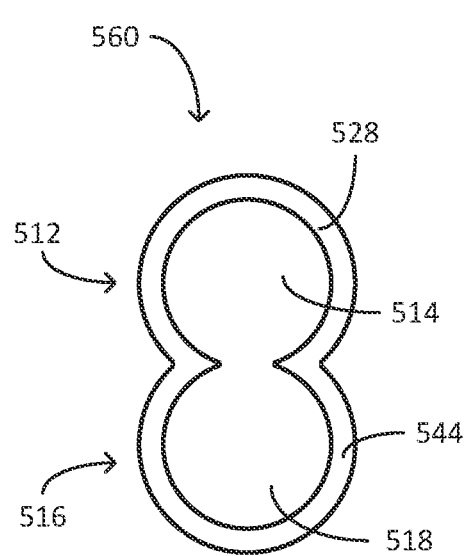
FIG. 12 illustrates an example of an apparatus defining a first shape.
Figure 13:
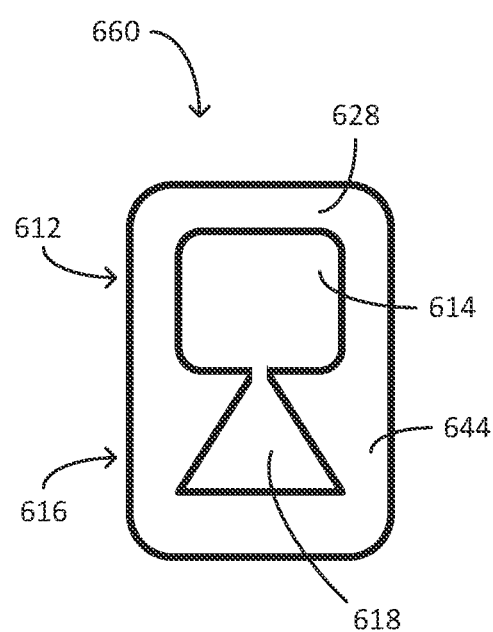
FIG. 13 illustrates an example of an apparatus defining a second shape.

For example, FIG. 12 illustrates a lower pack section 560 including a portion of foil pack 512, device enclosure wall 528, device enclosure 514, fluid conduit 516, conduit wall 544, and fluid channel 518. FIG. 13 illustrates a lower pack section 660 including a portion of foil pack 612, device enclosure wall 628, device enclosure 614, fluid conduit 616, conduit wall 644, and fluid channel 618. Foil pack 512, 612, device enclosure wall 528,628, device enclosure 514,614, fluid conduit 516 616, conduit wall 544, 644, and fluid channel 518, 618 may be configured individually and in relation to each other in the same manner as that described for the like-named components of apparatus 10 (FIG. 1), apparatus 110 (FIGS. 2, 3), and apparatus 210 (FIGS. 4, 5). Apparatus 10, 110, 210 may have any shape to, e.g., promote packaging efficiency and fabrication reliability. For example, apparatus 10, 110, 210 may define a substantially hour-glass shape (FIG. 12), a corner to corner arrangement (FIG. 13), and others.

Scaffolding 24, 124, 224, 324, 424 can have any suitable configuration. In some examples, one or more components and/or structures of scaffolding 24, 124, 224, 324 are formed and/or defined to be physically separate from a remainder of scaffolding 24, 124, 224, 324, 424 and subsequently attached to define scaffolding 24, 124, 224, 324, 424. In other examples, the components and structures of scaffolding 24, 124, 224, 324, 424 are formed and/or defined to have a unitary body construction, e.g., are formed to be one piece. Scaffolding 24, 124, 224, 324, 424 may be formed and/or defined by molding, 3D printing, machining out of bar stock, investment casting, or some other suitable method. Scaffolding 24, 124, 224, 324, 424 can be formed and/or defined from any suitable materials, such as, but not limited to polymers, glasses, rubbers, and/or metals. In some examples, the components and/or structures of scaffolding 24, 124, 224, 324, 424 may be formed and/or defined from the same material, while in other examples, at least two of the components and/or structures of scaffolding 24, 124, 224, 324, 424 are formed and/or defined from different materials.

Further, foil pack 12, 112, 212 and/or fluid conduit 16, 116, 216 can have any suitable configuration. In some examples, one or more components and/or structures of foil pack 12, 112, 212 and/or fluid conduit 16, 116, 216 are formed and/or defined to be physically separate from a remainder of foil pack 12, 112, 212 and/or fluid conduit 16, 116, 216 and subsequently attached to define foil pack 12, 112, 212 and/or fluid conduit 16, 116, 216. In other examples, the components and structures of foil pack 12, 112, 212 and/or fluid conduit 16, 116, 216 have a unitary body construction, e.g., are formed and/or defined to be one piece. Foil pack 12, 112, 212 and/or fluid conduit 16, 116, 216 may be formed and/or defined by molding, 3D printing, machining out of bar stock, investment casting, or some other suitable method. Foil pack 12, 112, 212 and/or fluid conduit 16, 116, 216 can be formed and/or defined from any suitable materials, such as, but not limited to metals, polymers, glasses, and/or rubbers. In some examples, foil pack 12, 112, 212 and/or fluid conduit 16, 116, 216 may be formed and/or defined from the same material, while in other examples, at least two of the components and/or structures of foil pack 12, 112, 212 and/or fluid conduit 16, 116, 216 are formed and/or defined from different materials.

Figure 11:
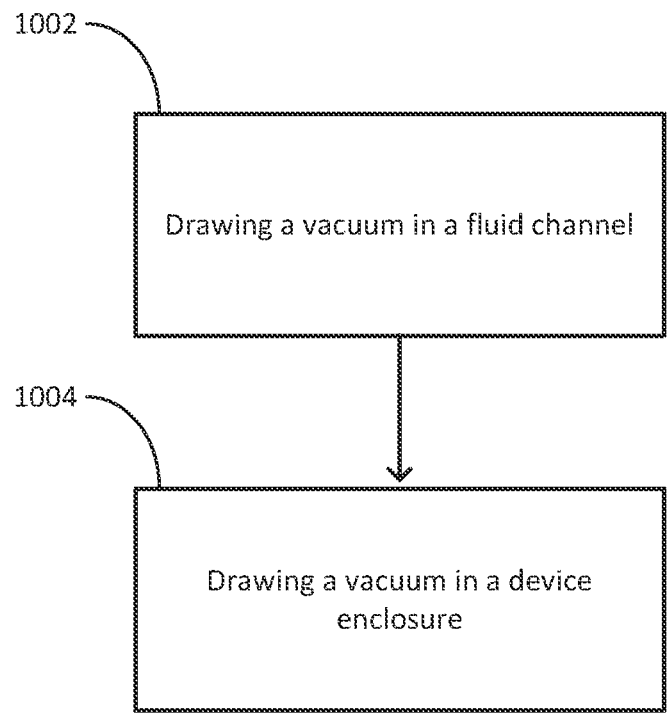
FIG. 11 illustrates an example technique for testing a device enclosure.

A technique for establishing a vacuum in a device enclosure is illustrated in FIG. 11. Although the technique is described mainly with reference to apparatus 10, 110, 210 of FIGS. 1-9, the technique may be applied to other apparatuses in other examples.

The technique includes drawing a vacuum in a fluid channel 18, 118, 218 (1002). Fluid channel 18, 118, 218 may be defined by a fluid conduit 16, 116, 216. Fluid conduit 16, 116, 216 may define a test port 20, 120, 220. The technique may include drawing the vacuum in the fluid channel using test port 20, 120, 220. In examples, fluid conduit 16, 116, 216 defines fluid channel 18, 118, 218 such that a fluid may flow from a device enclosure 14, 214 through test port 20, 120, 220 via fluid channel 18, 118, 218. The technique may include drawing the vacuum in fluid channel 18, 118, 218 using a test line 54 in fluid communication with a test apparatus 56. In examples, test line 54 is in fluid communication with test port 20, 120, 220. In some examples, test line 54 is in fluid communication with a flow outlet 284 defined by an extension conduit 502.

Fluid conduit 16, 116, 216 may include a conduit wall 44, 144, 244 having an inner conduit surface 46, 246 and an outer conduit surface 48, 148, 248. Fluid conduit 16, 116, 216 may define fluid channel 18, 118, 218 using inner conduit surface 46, 246. In examples, the technique includes establishing a vacuum in fluid channel 18, 118, 218 relative to a pressure acting on some portion of outer conduit surface 48, 148, 248.

The technique includes drawing a vacuum in device enclosure 14, 214 using the vacuum drawn on fluid channel 18, 118, 218 (1004). The technique may include resisting a collapse of fluid channel 18, 118, 218 using a scaffolding 24, 124, 224, 324, 424 within fluid channel 18, 118, 218. In examples, the technique includes substantially maintaining the flow path defined by fluid channel 18, 118, 218 using scaffolding 24, 124, 224, 324, 424. The technique may include substantially maintaining the flow path defined by fluid channel 18, 118, 218 using an interconnected porosity of scaffolding 24, 124. The technique may include substantially maintaining the flow path defined by fluid channel 18, 118, 218 using at least one flow inlet 380, 381, 382, 480, 481, 482 defined by a rigid frame of scaffolding 224, 324, 424 and at least one flow outlet 284, 384, 484 defined by the rigid frame of scaffolding 224, 324, 424, 524.

The technique may include shrinking fluid channel 18, 118, 218 toward scaffolding 24, 124, 224, 324, 424 when the vacuum is drawn in fluid channel 18, 118, 218. The technique may include exerting a reaction force on conduit wall 44, 144, 244 using scaffolding 24, 124, 224, 324, 424 when conduit wall 44, 144, 244 contacts scaffolding 24, 124, 224, 324, 424.

The technique may include positioning an energy storage device 26, 226 within device enclosure 14, 214. The technique may include positioning energy storage device 26, 226 such that first conductor 34, 234 and second conductor 36, 236 of energy storage device 26, 226 extend from device enclosure 14, 214 through device enclosure wall 28, 128, 228. In examples, energy storage device 26, 226 includes first electrode plate 38, 238 electrically connected to first conductor 34, 234 and second electrode plate 40, 240 electrically connected to second conductor 36, 236. The technique may include positioning first electrode plate 38, 238 and second electrode plate 40, 240 in device enclosure 14, 214. In examples, the technique include positioning a separator 42 between first electrode plate 38, 238 and second electrode plate 40, 240 in device enclosure 14, 214. In some examples, the technique includes positioning a battery in device enclosure 14, 214. In some examples, the technique includes positioning a capacitor in device enclosure 14, 214.

The technique may include attaching a lower pack section 58, 158, 258 defining test port 20, 120, 220 to an upper pack section 60, 160, 260 to define fluid channel 18, 118, 218 and device enclosure 14, 214. The technique may include attaching lower pack section 58, 158, 258 to upper pack section 60, 160, 260 by heat sealing, adhesives, fasteners, soldering, or some other suitable method. In examples, the technique includes establishing a boundary 62, 162, 262 between lower pack section 58, 158, 258 and upper pack section 60, 160, 260. The technique may include positioning first conductor 34, 234 and second conductor 36, 236 between lower pack section 58, 158, 258 and upper pack section 60, 160, 260.

In some examples, the technique includes maintaining fluid communication between fluid channel 18, 118, 218 and device enclosure 14, 214 using a support member 394 defined by a rigid frame of scaffolding 224, 324, 424. The technique may include positioning scaffolding 224, 324, 424 such that a support member surface 396 defined by support member 394 is displaced from an upper scaffolding surface 275, 375, 475 and/or a lower scaffolding surface 277, 377, 477. In examples, the technique includes positioning scaffolding 224, 324, 424 such that a support member surface 396 is displaced from a geometric plane defining some portion of upper scaffolding surface 275, 375, 475 and/or a lower scaffolding surface 277, 377, 477. The technique may include inserting support member 394 into a fluid channel opening 22, 222 defined by fluid channel 18, 118, 218 and opening into device enclosure 14, 114, 214. In examples, the technique includes positioning scaffolding 24, 124, 224, 324, 424 in a scaffolding enclosure 290 defined by conduit wall 44, 144, 244. The technique may include positioning support member 394 over a separation wall.

In examples, the technique includes extending an extension conduit 502 through test port 20, 120, 220 when scaffolding 424 is positioned within fluid channel 18, 118, 218. The technique may include establishing fluid communication between a flow outlet 484 defined by extension conduit 502 and fluid channel 18, 118, 218. The technique may include establishing fluid communication between test line 54 and flow outlet 484.

The technique may include resisting a deflection of a test port section 68, 168, 268 defining test port 20, 120, 220 using scaffolding 24, 124, 224, 324, 424. Test port section 68, 168, 268 may be defined by conduit wall 44. In examples, the technique includes limiting movement of test port section 68, 168, 268 when a force exerts on test port section 68, 168, 268 in a direction from outer conduit surface 48, 148, 248 to inner conduit surface 46, 246.

The technique may include surrounding outer conduit surface 48, 148, 248 of conduit wall 44, 144, 244 and outer enclosure surface 32, 132, 232 of device enclosure wall 28, 128, 228 with a test gas. The technique may include fluidly isolating fluid channel 18, 118, 218 and device enclosure 14, 114, 214 from the test gas. The technique may include withdrawing a flow of fluid from fluid channel 18, 118, 218 when outer conduit surface 48, 148, 248 and outer enclosure surface 32, 132, 232 and analyzing the flow of fluid for the presence of the test gas. The technique may include evaluating pack boundary 62, 162, 262, electrode boundary 64, and/or electrode boundary 66 based on the presence or substantial absence of the test gas.

The technique may include separating fluid channel 18, 118, 218 and device enclosure 14, 114, 214. In examples, the technique include separating fluid channel 18, 118, 218 and device enclosure 14, 114, 214 following evaluation of pack boundary 62, 162, 262, electrode boundary 64, and/or electrode boundary 66. The technique may include fluidly isolating device enclosure 14, 114, 214. In examples, the technique includes fluidly isolating inner enclosure surface 30, 230 from outer enclosure surface 32, 132, 232 when energy storage device 26, 226 is positioned within device enclosure 14, 114, 214.

In some examples, the technique includes electrically connecting first conductor 34, 234 and second conductor 36, 236 to a charging apparatus configured to provide a charging current to energy storage device 26, 226. The technique may include providing a charging current to energy storage device 26, 226 using the charging apparatus. The technique may include collecting a gas generated by the charging in fluid channel 18, 118, 218. The technique may include venting the gas from fluid channel 18, 118, 218 using test port 20, 120, 220. In some examples, the technique includes supplying an electrolyte to device enclosure 14, 114, 214 using fluid channel 18, 118, 218 and test port 20, 120, 220.

As discussed, energy storage device 26, 226 may include a battery and/or capacitor. In examples, energy storage device 26, 226 comprises a stacked assembly. For example, first electrode plate 38, 238 may be one of a plurality of cathode electrode plates. Each cathode electrode plate may include a cathode current collector, a cathode plate tab extending therefrom, and a cathode material. The cathode electric plate and cathode plate tab may comprise a conductive material (e.g., aluminum, titanium, copper, and/or alloys thereof). The cathode material may include metal oxides (e.g., vanadium oxide, silver vanadium oxide (SVO), manganese dioxide, etc.), carbon monofluoride and hybrids thereof (e.g., $CF_x+MnO2$), combination silver vanadium oxide (CSVO), lithium ion, other rechargeable chemistries, or other suitable compounds. In examples, one or more electrode plates comprises a high surface area plate. In examples, an electrode plate includes at least one of niobium, tin, and oxides thereof. In some examples, an electrode plate configured as a cathode includes a relatively thin oxide layer, and an electrode plate configured as an anode includes an oxide layer thicker than that of the cathode.

The plurality of cathode electrode plates may define a set of cathode plate tabs extending therefrom in a stacked configuration. One or more cathode tab spacers may be located between respective cathode plate tabs. The respective cathode plate tabs (and in some examples respective cathode tab spacers) may be attached to each other by side welds. In examples, in addition to, or as an alternative to, one or more side welds, a rivet or other alignment member may be employed to attach the cathode plate tabs and cathode tab spacers to each other, e.g., by mechanical fastening. The cathode plate tabs may comprise a conductor, such as first conductor 34, 234.

In examples, second electrode plate 40, 240 is one of a plurality of anode electrode plates. Each anode electrode plate may include an anode current collector, an anode plate tab extending therefrom, and an anode material. The anode electric plate may comprise a conductive material. The anode plate tab may comprise titanium, nickel, niobium, tantalum, vanadium or other suitable materials. The plurality of anode electrode plates may define a set of anode plate tabs extending therefrom in a stacked configuration. One or more anode tab spacers may be located between respective anode plate tabs. The respective anode plate tabs (and in some examples respective anode tab spacers) may be attached to each other by side welds. In examples, in addition to, or as an alternative to, one or more side welds, a rivet or other alignment member may be employed to attach the anode plate tabs and anode tab spacers to each other, e.g., by mechanical fastening. The anode plate tabs may comprise a conductor, such as second conductor 36, 236.

In examples, the cathode tab spacers and/or anode tab spacers comprise an electrically conductive material. Example materials for the cathode tab spacers and/or anode tab spacers may include titanium. nickel, alloys thereof or other suitable materials. In other examples, the cathode tab spacers and/or anode tab spacers may be an electrically insulating material.

Energy storage device 26, 226 may be assembled by sequentially stacking cathode electrode plates and anode electrode plates For example, the individual electrode plates and corresponding spacers may be sequentially stacked onto each other by positioning a cathode electrode plate and cathode plate tab, followed by placement of an anode electrode plate and anode plate tab on top of that cathode electrode plate, as so forth, along with one or more cathode tab spacers and/or anode tab spacers as appropriate between the cathode plate tabs and anode plate tabs to arrive at a stacked assembly. The cathode plate tabs may be compressed and held together, e.g., by a penetration weld. The anode plate tabs may be compressed and held together, e.g., by a penetration weld. Any suitable technique may be employed to form the penetration weld, including, e.g., laser welding or electron beam welding, compression cold welding. In some examples, once a penetration weld has been formed, a portion of the ends of one or more of cathode plate tabs and/or anode plate tabs may be trimmed or otherwise removed.

The present disclosure includes the following examples.

Example 1: An apparatus comprising: a foil pack defining a device enclosure configured to enclose an energy storage device; a fluid conduit defining a test port and defining a fluid channel in fluid communication with the device enclosure, wherein the fluid channel defines a flow path configured to allow a flow of a fluid from the device enclosure through the test port; and a scaffolding within the fluid channel configured to resist a collapse of the fluid channel when a vacuum is established in the fluid channel.

Example 2: The apparatus of example 1, wherein the foil pack is configured to establish a vacuum in the device enclosure when the vacuum is established in the fluid channel.

Example 3: The apparatus of example 1 or 2, wherein the scaffolding is configured to substantially maintain the flow path defined by the fluid channel when the scaffolding is within the fluid channel.

Example 4: The apparatus of example 3, wherein the scaffolding is a porous material having an interconnected porosity, wherein the porous material is configured to use the interconnected porosity to substantially maintain the flow path defined by the fluid channel.

Example 5: The apparatus of example 4, wherein the scaffolding is a rigid frame defining at least one flow inlet and at least one flow outlet configured to substantially maintain the flow path defined by the fluid channel.

Example 6: The apparatus of any combination of examples 1-5, wherein the fluid conduit includes a conduit exterior and a conduit interior, wherein the conduit interior defines the fluid channel, and wherein the scaffolding is configured to resist the collapse of the fluid channel when the vacuum is established in the fluid channel relative to a pressure acting on the conduit exterior.

Example 7: The apparatus of example 6, wherein the test port is configured to establish fluid communication from the conduit exterior to the conduit interior.

Example 8: The apparatus of any combination of examples 1-7, wherein the fluid conduit includes a conduit exterior and a conduit interior, and wherein the fluid conduit includes a test port section defining the test port, and wherein the scaffolding is configured to support the test port section when a force in a direction from the conduit exterior to the conduit interior is applied to the test port section.

Example 9: The apparatus of any combination of examples 1-8, further comprising the energy storage device within the device enclosure.

Example 10: The apparatus of example 9, wherein the energy storage device includes a first conductor and a second conductor, wherein the first conductor and the second conductor extend from the device enclosure through a device enclosure wall defining the device enclosure.

Example 11: The apparatus of any combination of examples 1-10, wherein the apparatus is configured to shrink the fluid conduit toward the scaffolding when the vacuum is established in the fluid conduit.

Example 12: The apparatus of any combination of examples 1-11, wherein the apparatus comprises a lower pack section and an upper pack section, wherein the upper pack section defines the test port, and wherein the upper pack section is configured to contact the lower pack section to define the fluid conduit and the device enclosure.

Example 13: The apparatus of any combination of examples 1-12, wherein the scaffolding includes a support member configured to extend from the fluid channel to the device enclosure, wherein the support member is configured to substantially maintain fluid communication between the device enclosure and the fluid channel when the vacuum is established in the fluid channel.

Example 14: The apparatus of any combination of examples 1-13, wherein the scaffolding includes an extension conduit defining a flow outlet, wherein the extension conduit is configured to extend through the test port and configured to establish fluid communication between the flow outlet and the fluid channel.

Example 15: An apparatus comprising: a foil pack defining a device enclosure; an energy storage device within the device enclosure, wherein the energy storage device includes a first conductor and a second conductor, wherein the first conductor and the second conductor extend from the device enclosure through a device enclosure wall defining the device enclosure; a fluid conduit including a conduit exterior and a conduit interior and defining a test port, wherein the conduit interior defines a fluid channel in fluid communication with the device enclosure, and wherein the fluid channel defines a flow path configured to allow a flow of a fluid from the device enclosure through the test port; and a scaffolding within the fluid channel configured to resist a collapse of the fluid channel when a vacuum is established in the fluid channel relative to a pressure acting on the conduit exterior, and wherein the apparatus is configured to shrink the fluid conduit toward the scaffolding when the vacuum is established in the fluid channel.

Example 16: The apparatus of example 15, wherein the foil pack is configured to establish a vacuum in the device enclosure when the vacuum is established in the fluid channel.

Example 17: The apparatus of example 15 or 16, wherein the scaffolding is a porous material having an interconnected porosity, wherein the porous material is configured to use the interconnected porosity to substantially maintain the flow path defined by the fluid channel.

Example 18: The apparatus of example 15 or 16, wherein the scaffolding is a rigid frame defining at least one flow inlet and at least one flow outlet configured to substantially maintain the flow path defined by the fluid channel.

Example 19: A method comprising: drawing a vacuum in a fluid channel defined by a fluid conduit using a test port defined by the fluid conduit; drawing a vacuum in a device enclosure of a foil pack using the vacuum drawn on the fluid channel; and resisting a collapse of the fluid channel as the vacuum is drawn using a scaffolding within the fluid channel.

Example 20: The method of example 19, further comprising substantially maintaining a flow path for a fluid from the device enclosure through the test port using the scaffolding.

Various examples of the disclosure have been described. Any combination of the described systems, operations, or functions is contemplated. These and other examples are within the scope of the following claims.

What is claimed is:

1. An apparatus comprising:
 a foil pack defining a device enclosure configured to enclose an energy storage device;
 a fluid conduit defining a test port, defining a fluid channel opening which opens into the device enclosure, and defining a fluid channel which defines a flow path fluidically coupling the test port and the fluid channel opening; and
 a scaffolding within the fluid channel configured to resist a collapse of the fluid channel when a vacuum is established in the fluid channel.

2. The apparatus of claim 1, wherein the foil pack is configured to establish a vacuum in the device enclosure when the vacuum is established in the fluid channel.

3. The apparatus of claim 1, wherein the scaffolding is configured to substantially maintain the flow path defined by the fluid channel when the scaffolding is within the fluid channel.

4. The apparatus of claim 1, wherein the scaffolding is a porous material having an interconnected porosity, wherein the porous material is configured to use the interconnected porosity to substantially maintain the flow path defined by the fluid channel.

5. The apparatus of claim 1, wherein the scaffolding is a rigid frame defining at least one flow inlet and at least one flow outlet configured to substantially maintain the flow path defined by the fluid channel.

6. The apparatus of claim 1, wherein the fluid conduit includes a conduit exterior and a conduit interior, wherein the conduit interior defines the fluid channel, and wherein the scaffolding is configured to resist the collapse of the fluid channel when the vacuum is established in the fluid channel relative to a pressure acting on the conduit exterior.

7. The apparatus of claim 6, wherein the test port is configured to establish fluid communication from the conduit exterior to the conduit interior.

8. The apparatus of claim 1, wherein the fluid conduit includes a conduit exterior and a conduit interior, and wherein the fluid conduit includes a test port section defining the test port, and wherein the scaffolding is configured to support the test port section when a force in a direction from the conduit exterior to the conduit interior is applied to the test port section.

9. The apparatus of claim 1, further comprising the energy storage device within the device enclosure.

10. The apparatus of claim 9, wherein the energy storage device includes a first conductor and a second conductor, wherein the first conductor and the second conductor extend from the device enclosure through a device enclosure wall defining the device enclosure.

11. The apparatus of claim 1, wherein the apparatus is configured to shrink the fluid conduit toward the scaffolding when the vacuum is established in the fluid conduit.

12. The apparatus of claim 1, wherein the apparatus comprises a lower pack section and an upper pack section, wherein the upper pack section defines the test port, and wherein the upper pack section is configured to contact the lower pack section to define the fluid conduit and the device enclosure.

13. The apparatus of claim 1, wherein the scaffolding includes a support member configured to extend from the fluid channel to the device enclosure, wherein the support member is configured to substantially maintain fluid communication between the device enclosure and the fluid channel when the vacuum is established in the fluid channel.

14. The apparatus of claim 1, wherein the scaffolding includes an extension conduit defining a flow outlet, wherein the extension conduit is configured to extend through the test port and configured to establish fluid communication between the flow outlet and the fluid channel.

15. An apparatus comprising:
a foil pack defining a device enclosure;
an energy storage device within the device enclosure, wherein the energy storage device includes a first conductor and a second conductor, wherein the first conductor and the second conductor extend from the device enclosure through a device enclosure wall defining the device enclosure;
a fluid conduit including a conduit exterior and a conduit interior, the conduit interior defining a test port, defining a fluid channel opening which opens into the device enclosure, and defining a fluid channel which defines a flow path fluidically coupling the test port and the fluid channel opening; and
a scaffolding within the fluid channel configured to resist a collapse of the fluid channel when a vacuum is established in the fluid channel relative to a pressure acting on the conduit exterior, wherein the apparatus is configured to shrink the fluid conduit toward the scaffolding when the vacuum is established in the fluid channel.

16. The apparatus of claim 15, wherein the foil pack is configured to establish a vacuum in the device enclosure when the vacuum is established in the fluid channel.

17. The apparatus of claim 15, wherein the scaffolding is a porous material having an interconnected porosity, wherein the porous material is configured to use the interconnected porosity to substantially maintain the flow path defined by the fluid channel.

18. The apparatus of claim 15, wherein the scaffolding is a rigid frame defining at least one flow inlet and at least one flow outlet configured to substantially maintain the flow path defined by the fluid channel.

19. A method comprising:
drawing a vacuum in a fluid channel defined by a fluid conduit using a test port defined by the fluid conduit, wherein the fluid conduit defines a fluid channel opening which opens into a device enclosure of a foil pack configured to enclose an energy storage device, and wherein the fluid channel defines a flow path fluidically coupling the test port and the fluid channel opening;
drawing a vacuum in the device enclosure using the vacuum drawn on the fluid channel; and
resisting a collapse of the fluid channel as the vacuum is drawn using a scaffolding within the fluid channel.

20. The method of claim 19, further comprising substantially maintaining a flow path for a fluid from the device enclosure through the test port using the scaffolding.

* * * * *